US006898197B1

(12) United States Patent
Lavean

(10) Patent No.: US 6,898,197 B1
(45) Date of Patent: May 24, 2005

(54) GEOLOCATION OF A MOBILE TERMINAL IN A CDMA COMMUNICATION SYSTEM

(75) Inventor: Gil Lavean, Berkeley Springs, WV (US)

(73) Assignee: InterDigital Technology Corporation, Wilmington, DE (US)

(*) Notice: Subject to any disclaimer, the term of this patent is extended or adjusted under 35 U.S.C. 154(b) by 584 days.

(21) Appl. No.: 09/653,057

(22) Filed: Sep. 1, 2000

Related U.S. Application Data

(63) Continuation of application No. 09/280,327, filed on Mar. 29, 1999, now Pat. No. 6,141,332, which is a continuation of application No. 08/807,228, filed on Feb. 28, 1997, now Pat. No. 5,943,331.

(51) Int. Cl.[7] .......................... H04L 7/216; H04Q 7/20
(52) U.S. Cl. .................. 370/335; 370/508; 455/456.1; 342/357.01
(58) Field of Search ................................. 370/335, 342, 370/350, 508; 342/126, 133, 140, 450, 458, 357.1, 357.09; 455/404.1–404.2, 456.1–457

(56) References Cited

U.S. PATENT DOCUMENTS

| 4,744,083 A | * | 5/1988 | O'Neill et al. .............. 714/704 |
| 4,912,722 A | | 3/1990 | Carlin |
| 5,103,459 A | | 4/1992 | Gilhousen et al. |
| 5,228,056 A | | 7/1993 | Schilling |
| 5,293,645 A | * | 3/1994 | Sood ....................... 455/456.2 |

(Continued)

FOREIGN PATENT DOCUMENTS

WO         96/08908     *  3/1996

OTHER PUBLICATIONS

"A Coherent Detection Scheme for the Uplink Channel in a CDMA System", Brismark, G. et al., VTC 1994, Creating Tomorrow's Mobile Systems, 1994 IEEE 44th Vehicular Technology Conference (Cat. No. 94CH3438–9), Stockholm, Sweden.

*Primary Examiner*—Steven Nguyen
(74) *Attorney, Agent, or Firm*—Volpe and Koenig, P.C.

(57) ABSTRACT

A cellular radio system in which a base station receiver can receive, on the reverse link, data from a mobile terminal in one of four control modes. In the first mode, the mobile terminal sends an independent user pilot, not synchronized with the base station, on the reverse link and the user data channel is synchronized to this independent user pilot. In the second mode, the mobile terminal slaves its user pilot to the pilot it receives from the base station and the user data channel is synchronized with this slaved user pilot. This second mode allows the user terminal to receive round trip delay information for purposes of geolocation and rapid reacquisition. In the third mode, the mobile terminal slaves its user pilot to the incoming base station pilot, as in the case of mode two, but the user data channel operates in the orthogonal mode using the ranging information received from the base station. The phase relationship between the user pilot channel and the user data channel is calibrated. The user pilot carrier is also the carrier for the user data channel and can be used as the carrier reference for detecting the user data channel. In the fourth mode, the slaved pilot implementation of mode three is used for acquisition but, after acquisition, the user pilot code is phase shifted to be synchronous with the user data channel, thus also making it an orthogonal channel. In this mode, the pilots no longer contribute interference to the user data channels, within the cell, and can be transmitted at higher power levels.

9 Claims, 12 Drawing Sheets

U.S. PATENT DOCUMENTS

| | | | |
|---|---|---|---|
| 5,297,162 A | | 3/1994 | Lee et al. |
| 5,365,544 A | * | 11/1994 | Schilling .................... 370/342 |
| 5,506,864 A | | 4/1996 | Schilling |
| 5,508,708 A | * | 4/1996 | Ghosh et al. ............... 342/457 |
| 5,544,156 A | | 8/1996 | Teder et al. |
| 5,559,790 A | | 9/1996 | Yano et al. |
| 5,600,706 A | * | 2/1997 | Dunn et al. .............. 455/456.2 |
| 5,614,914 A | * | 3/1997 | Bolgiano et al. ........... 342/457 |
| 5,617,410 A | | 4/1997 | Matsumoto |
| 5,646,632 A | * | 7/1997 | Khan et al. .................. 342/457 |
| 5,689,525 A | | 11/1997 | Takeishi |
| 5,696,766 A | | 12/1997 | Yeung et al. |
| 5,737,326 A | | 4/1998 | I et al. |
| 5,745,496 A | | 4/1998 | Lysejko |
| 5,799,010 A | | 8/1998 | Lomp et al. |
| 5,940,382 A | | 8/1999 | Haim |
| 5,974,039 A | | 10/1999 | Schilling |
| 6,034,635 A | * | 3/2000 | Gilhousen ................... 342/457 |

* cited by examiner

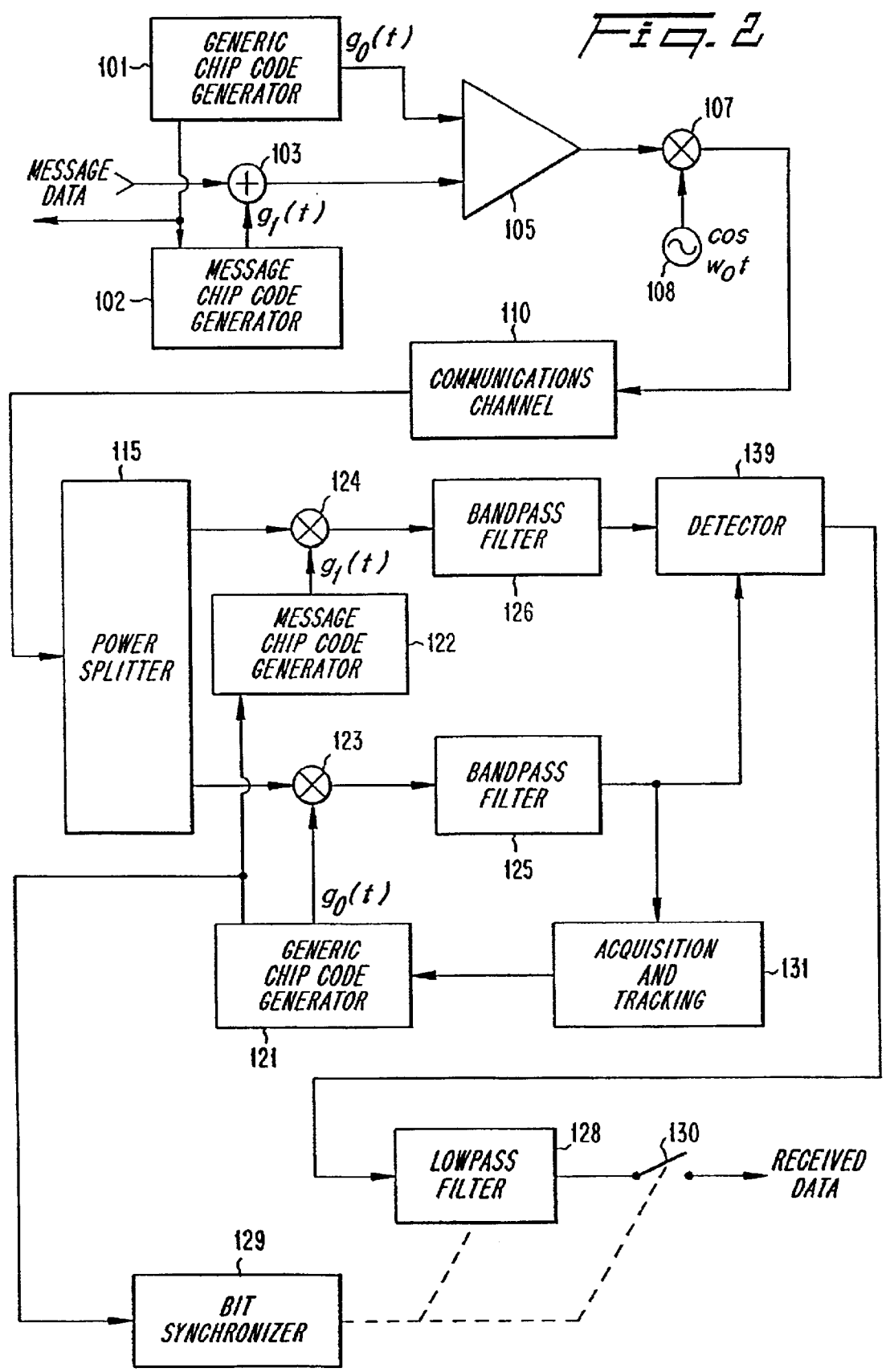

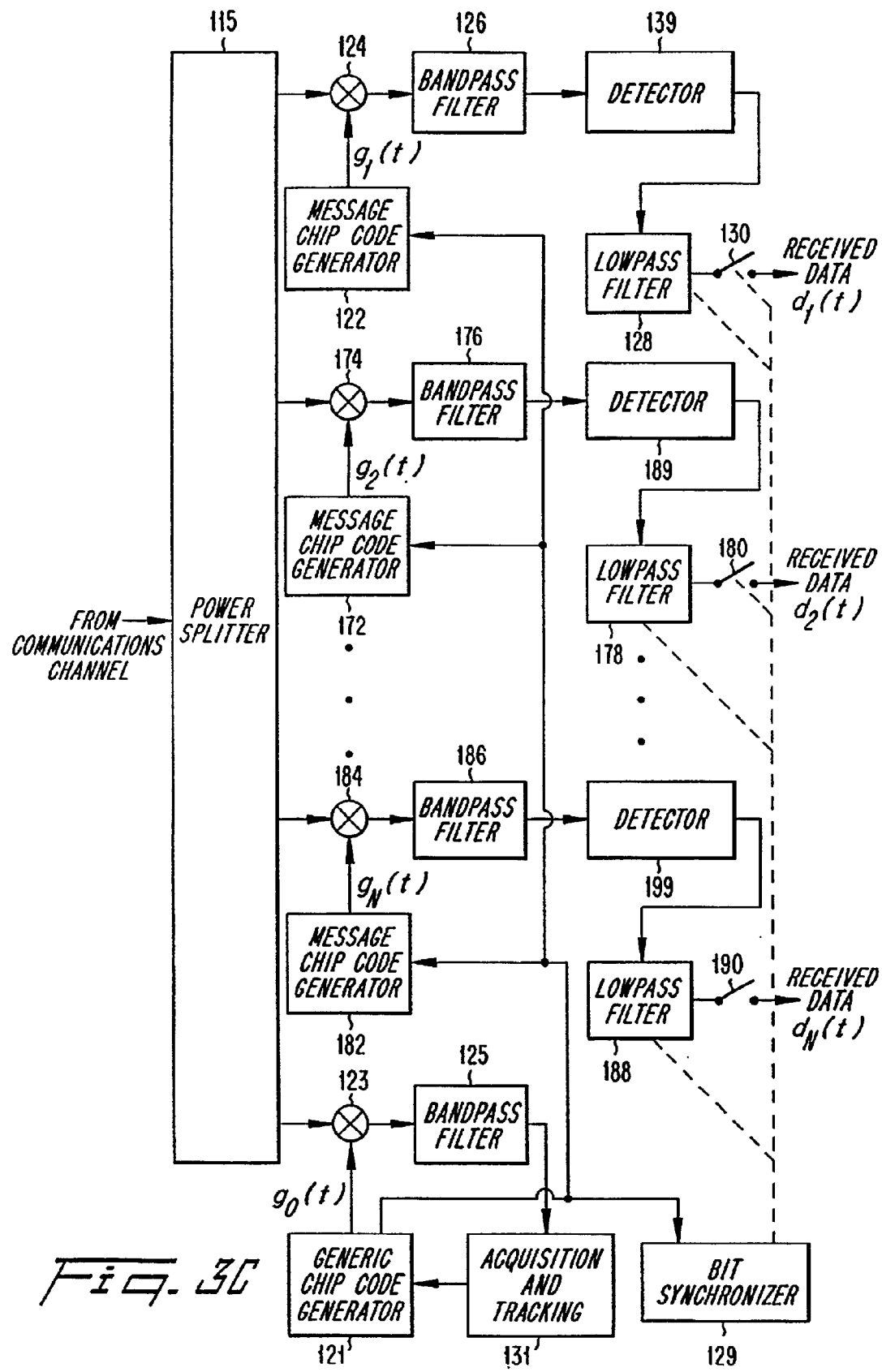

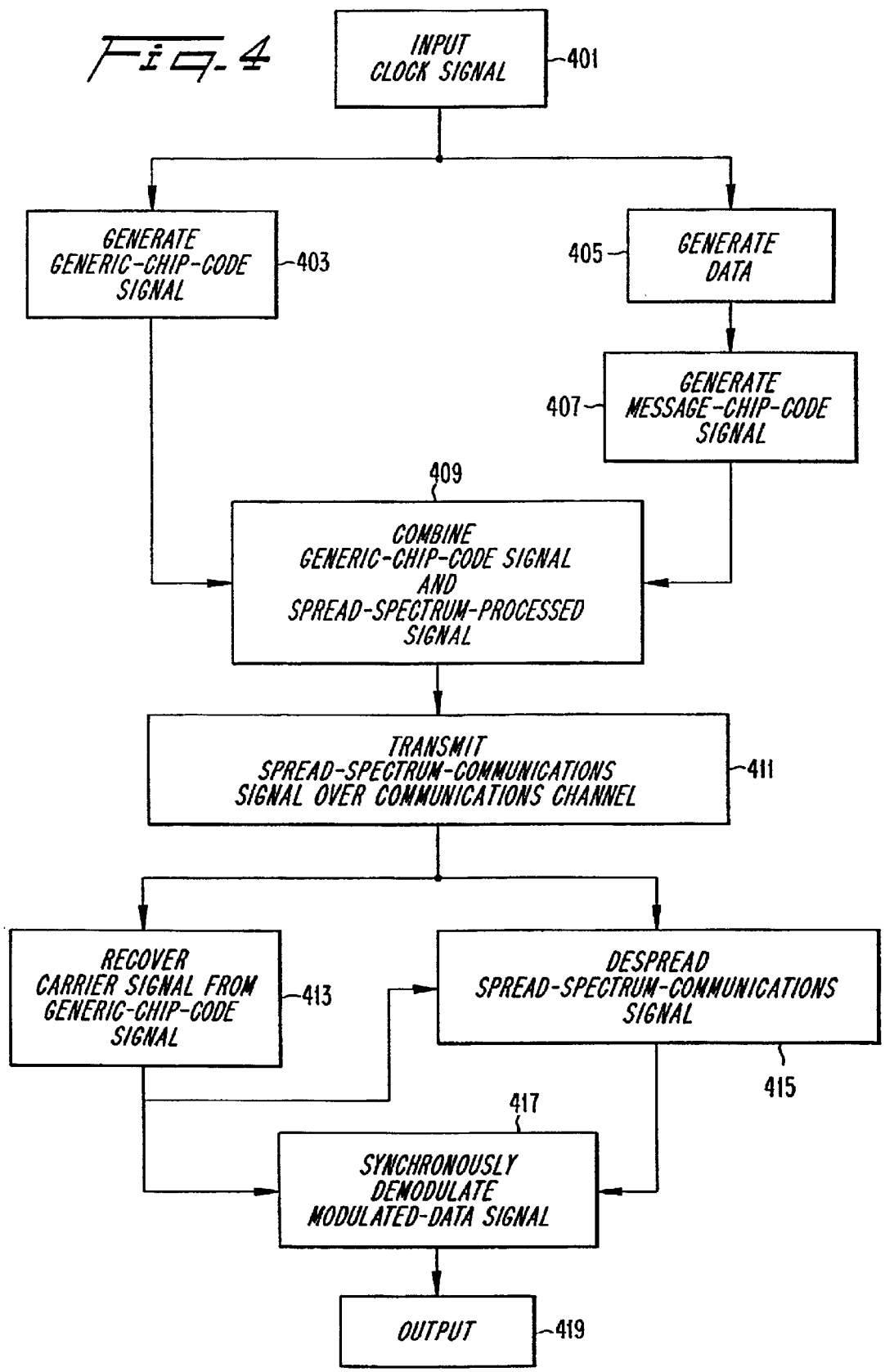

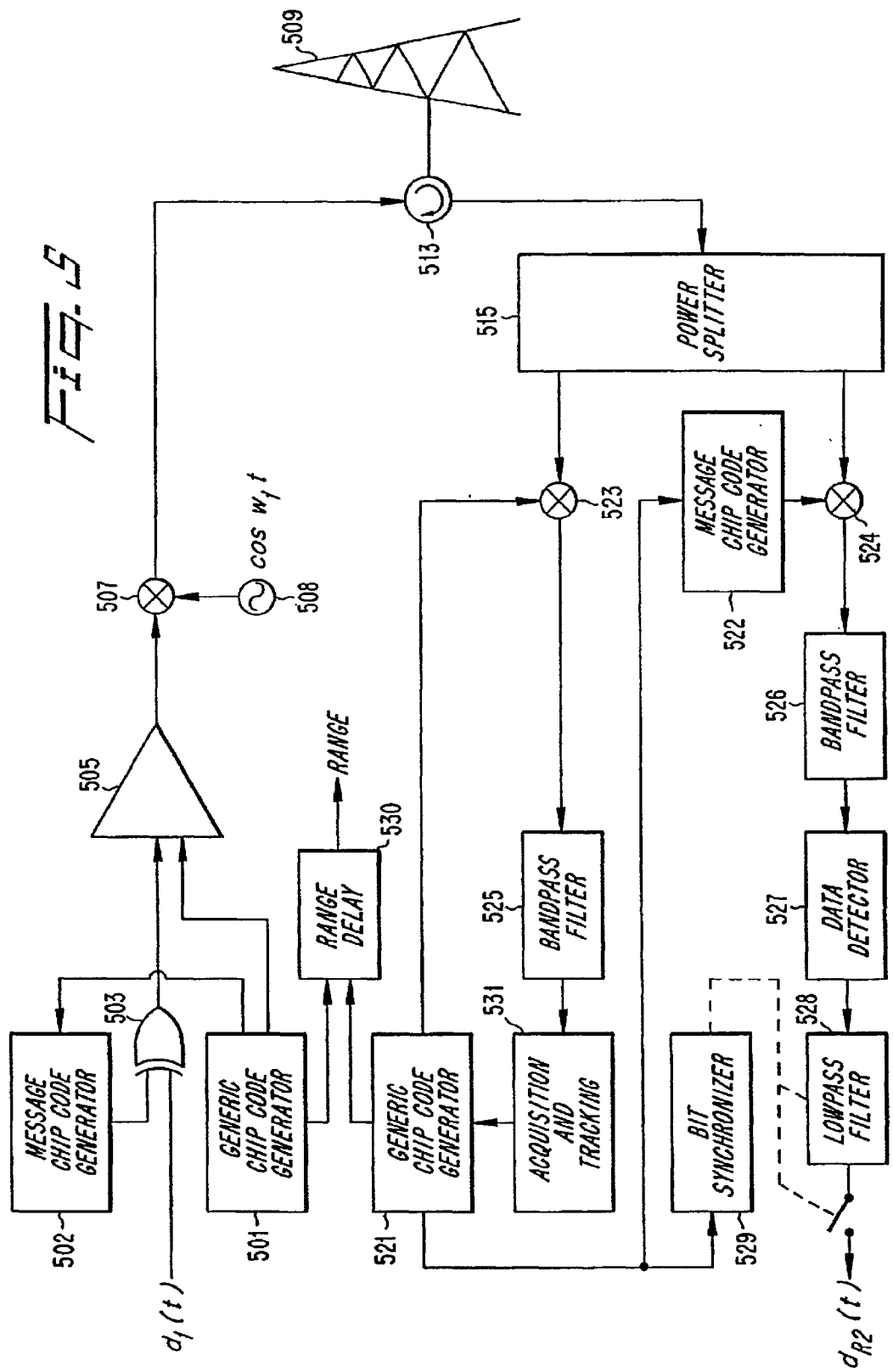

GEOLOCATION OF A MOBILE TERMINAL IN A CDMA COMMUNICATION SYSTEM

CROSS REFERENCES TO RELATED APPLICATIONS

This patent is a continuation application of U.S. patent application Ser. No. 09/280,327, filed Mar. 29, 1999, now U.S. Pat. No. 6,141,332, which is a continuation of U.S. patent application Ser. No. 08/807,228, filed Feb. 28, 1997, now U.S. Pat. No. 5,943,331.

BACKGROUND OF THE INVENTION

This invention relates to spread-spectrum communications and more particularly to a system and method using orthogonal codes and knowledge of the distance between a mobile terminal and a base station to adjust and align the phase of an information channel to achieve orthogonality at the base station.

DESCRIPTION OF THE RELEVANT ART

Referring to FIG. 1, message data, d(t), are processed by spread-spectrum modulator 51, using a message-chip-code signal, $g_1(t)$, to generate a spread-spectrum data signal. The spread-spectrum data signal is processed by transmitter 52 using a carrier signal at a carrier frequency $f_o$, and transmitted over communications channel 53.

At a receiver, a spread-spectrum demodulator 54 despreads the received spread-spectrum signal, and the message data are recovered by synchronous data demodulator 60 as received data. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal. A Costas Loop or other reference signal generating circuit is adequate for this purpose.

In a fading channel, such as the ionosphere or any channel containing multipath, or more generally, any channel in which the received signal's amplitude fluctuates with time, synchronous demodulation is not practical since the phase of the incoming signal typically is not the same as the phase of the reference. In such cases differential phase shift keying (DPSK) is employed. With DPSK the received signal is delayed by one symbol and multiplied by the underlayed signal. If the resulting phase is less than ±90° a 0-bit is declared, otherwise a 1-bit is declared. Such a system is complex and suffers degradation of about 6 dB at error rates of $10^{-2}$.

The prior art does not provide a system and method for synchronously communicating, using spread-spectrum modulation, with a base station and in combination using range to the mobile terminal to achieve orthogonality at the base station.

OBJECTS OF THE INVENTION

A general object of the invention is a geolocation system and method that can be used as a personal communications service.

An object of the invention is a system and method for synchronously communicating a modulated-data signal embedded in a CDMA signal, and for geolocating a remote unit, which performs well whether or not the signal is fading.

Another object of the invention is a geolocation system and method which uses a separate spread-spectrum channel as a pilot signal for a data link for geolocating a remote unit and for demodulating a modulated-data signal embedded in a CDMA signal.

An additional object of the invention is synchronous spread-spectrum-communications and geolocation system.

A further object of the invention is a spread spectrum system and method for using orthogonal codes and known range to a mobile terminal to achieve orthogonality of mobile terminal user data signals at the base station.

A still further object of the invention is a system and method for using orthogonal codes on a reverse link of a duplex radio channel.

The current cellular CDMA systems do not use orthogonal codes on the reverse link. In fact, the IS-95 systems use non-coherent detection on the reverse link. This is because of the difficulty in synchronizing the spreading codes with each other as they arrive at the base station from the multiple mobile users. For codes to be orthogonal, the different codes have to start at essentially the same time and end at the right time. Therefore, since the mobile user stations are at different distances from a base station, and probably moving, even if all the signals are synchronized when they leave the mobile stations, the different path lengths will make them non-synchronous when the signals arrive at the base station.

There are at least three different signals that can gain in the detection process if the sampling is done at the proper time or if the predetermined waveforms are properly aligned in time. Both of these concepts, i.e., sampling at the proper time or having known waveforms aligned, are generally referred to as being synchronized. In the case of carrier synchronization, the correct carrier phase must be tracked. This means the correct frequency is also followed and, therefore, a known waveform is phase aligned. In the case of PN code synchronization, it is necessary to slip the phase of the locally generated PN code in reference to the received PN code until the two signals have exact phase alignment; this alignment is maintained by keeping the chip clock for the locally generated PN code locked to the clock of the received PN code. Again, this is phase aligning a known waveform.

In the case of the information signal, there has to be a degree of uncertainty involved or there would be no information transmitted. Therefore, if the information is transmitted on a bit-by-by basis, a decision is made during each bit of information. If a noise averaging filter or integrator is matched to the predetermined bit rate, not predetermined phase of a predetermined waveform, and if the sample is made at the end of the bit period such that the integration process has reached a maximum, the phase or amplitude of the received signal can be measured to determine the information content. For instance a carrier sine wave, a predetermined waveform at $f_c$, continues over hundreds of cycles at a predetermined phase. The information signal can then change the phase to another predetermined and acceptable phase angle. This change in phase can represent a code which contains the information bit. The prior art contains a number of techniques for maintaining a synchronous local carrier even when the received carrier has its phase occasionally changed due to information.

In a CDMA system, there is a better way to derive a clean local carrier, at the receiver, than deriving it from the information channel. In a CDMA system it is possible to send the same RF carrier but with a different PN code superimposed on it. This signal has no unknown information on it; it is a completely predetermined signal known on both ends of the link. Since this signal has a different code than the user information channel code, it is completely resolvable from the user information channel. Therefore, the two signals can occupy the same spectrum at the same time and only cause minor interference to each other. This signal is called a pilot channel and can be filtered with a narrow filter at the receiver which allows it to be a very stable reference. The user information channel phase is then compared to this clean reference to determine what changes are made to reflect the information on the user information channel. On the forward link, the same pilot channel is used as the reference for many mobile user stations. As a result, the power of the pilot channel can be made several times greater than the power of an individual user information channel and still have a small impact on the total power transmitted by the base station. This power factor, combined with the fact that all the signals have the same originating point and the same timing source, makes it easy to use orthogonal codes on this forward transmission link. All the mobile users receive the same composite CDMA forward transmission signal and use the same pilot channel to extract their assigned user information channel from the composite CDMA signal.

The complexity in deriving and detecting orthogonal codes results in practical orthogonal codes being relatively short, i.e., 64 chips for IS-95 systems, with some other proposals at 128 chips. These short codes limit the available pre-detection processing gain. Since the codes are continuously repeated, the resulting structure of the spectrum consists of a small number of lines with large spaces between the lines; this is not very noise-like which is the result that is desired. Therefore, as in the case of IS-95, a longer, more noise-like code is superimposed on top of the orthogonal codes. If the pilot channel code is also one of the orthogonal codes, it will not contribute noise into the information channels. In the case of the IS-95, the pilot is Walsh code 0 which means it is just the superimposed noise-like code, because the Walsh 0 code is all zeros. To achieve the full cancellation of companion orthogonal codes, the codes must be perfectly aligned with all the zero crossings happening at exactly the same time. Any misalignment creates unmatched glitches that will cause interference to the desired signal. On the forward link, the multiple signals transmitted to all the mobiles are added together to form one composite CDMA signal. As a result, the signals are in perfect alignment with each other and since all signals travel the same path, they will stay aligned. Therefore, orthogonal codes are practical and straight-forward to implement. The only disadvantages are limited processing gain and the limited number of available codes.

Utilizing orthogonal codes on the reverse link is more difficult since the different codes are originating from the different mobile stations that are randomly distributed as a function of distance from the base station where the signals must arrive in perfect alignment. This means that, to have all the signals arrive in synchronism at the base station, each mobile station would have to start its reference point at a different time to compensate for the variance in path length. This has been considered too difficult to be practical in current systems. U.S. Pat. No. 5,404,376 addresses this issue by having the base station establish and broadcast a relationship between the mobile received C/I and distance that is continually updated on the basis of measured data. Based on this relationship, the mobile estimates the PN phase that will make the PN code arrive at the base station approximately in sync with other mobile transmissions. There are many problems with this approach. In particular, it is difficult to maintain a consistent relationship between C/I and distance from the base station. Even at best, this relationship will depend on the direction taken by the propagation path. U.S. Pat. No. 5,404,376 proposes some complicated techniques whereby correction factors are added to accommodate for the direction, or sector, wherein the mobile is located. At best the result is only an estimate and there is still a large uncertainty that has to be searched. This invention overcomes these difficulties by addressing the determination of the distance of the mobile from the base station in a unique, simple and direct manner.

SUMMARY OF THE INVENTION

According to the present invention, as embodied and broadly described herein, a spread spectrum code division multiple access (CDMA) communications system and method for communicating over a duplex radio channel is provided comprising at least one base station and a plurality of mobile terminals. Message data are communicated between the base stations and the mobile terminals. Message data includes, but are not limited to, digitized voice, computer data, facsimile data, video data, etc. The base station communicates base-message data over a forward channel to the plurality of mobile terminals. A mobile terminal communicates remote-message data over a reverse link to the base station. Base-message data are defined herein to be message data originating from a base station, and remote-message data are defined herein to be message data originating from a mobile terminal.

Remote message data is spread spectrum processed using a pseudo-noise code to generate spread-spectrum-processed-remote-message data. A remote-pilot signal is combined with the spread-spectrum-processed-remote-message data to generate a remote-CDMA signal. The remote-CDMA signal contains the remote-pilot signal and a data signal.

The remote-CDMA signal is transmitted from the mobile terminal to the base station on a reverse channel of the duplex radio channel. The base station receives the remote-CDMA signal and splits the remote-CDMA signal into a pilot channel and a data channel. The base station generates a base-pilot signal and a base-pilot-reference signal. The base-pilot-reference signal is split and delayed to generate an on-time version of the base-pilot-reference signal, an early version of the base-pilot-reference signal, and a late version of the base-pilot-reference signal. The on-time, the early and the late versions of the base-pilot-reference signal are used to correlate out an on-time, an early, and a late version, respectively, of the remote-pilot signal. The base station also generates a base-data-reference signal and correlates out the data signal using the base-data reference signal.

The phase of the remote-pilot signal is tracked and, in response to a peak in the remote-pilot signal, an acquisition signal is output signifying synchronization of the remote-pilot signal and the base-pilot-reference signal. In response to the acquisition signal, the code phase difference between the base-pilot signal and the base-pilot-reference signal is measured to determine the range between the mobile terminal and the base station. The range is transmitted to the mobile terminal on a forward channel and, in response to the range, the mobile terminal adjusts the phase of the pseudo-noise code to adjust an arrival time of the data signal at the base station and to achieve orthogonality with other arriving mobile terminal data signals at the base station.

The base station can receive, on the reverse link of the duplex channel, data from the mobile terminal in one of four control modes. In the first mode, the mobile terminal sends an independent user pilot, not synchronized with the base station pilot, on the reverse link and the user data channel is synchronized to this independent user pilot. In the second mode, the mobile terminal slaves its user pilot to the pilot it receives from the base station and the user data channel is synchronized with this slaved user pilot. This second mode allows the user terminal to receive round trip delay information for purposes of geolocation and rapid reacquisition. In the third mode, the mobile terminal slaves its pilot to the incoming base station pilot, as in the case of mode two, but the user data channel operates in the orthogonal mode using the ranging information received from the base station. The phase relationship between the user pilot channel and the user data channel is calibrated. The user pilot carrier is also the carrier for the user data channel and can be used as the carrier reference for detecting the user data channel. In the fourth mode, the slaved pilot implementation of mode three is used for acquisition but, after acquisition, the user pilot code is phase shifted to be synchronous with the user data channel, thus also making it an orthogonal channel. In this mode, the pilots no longer contribute interference to the user data channels, within the cell, and can be transmitted at higher power levels.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3A shows a synchronous spread spectrum transmitter system for a plurality of message data;

FIG. 3C shows a spread spectrum receiver using a non-synchronous detector for receiving a plurality of spread-spectrum processed signals;

FIG. 4 shows a synchronous spread-spectrum demodulating method;

FIG. 5 is a block diagram of a base station for communicating synchronously with, and geolocating a remote unit;

FIG. 6 is a block diagram of a remote unit for communicating with a base station and geolocation;

DETAILED DESCRIPTION OF THE PREFERRED EMBODIMENTS

Figure 1:
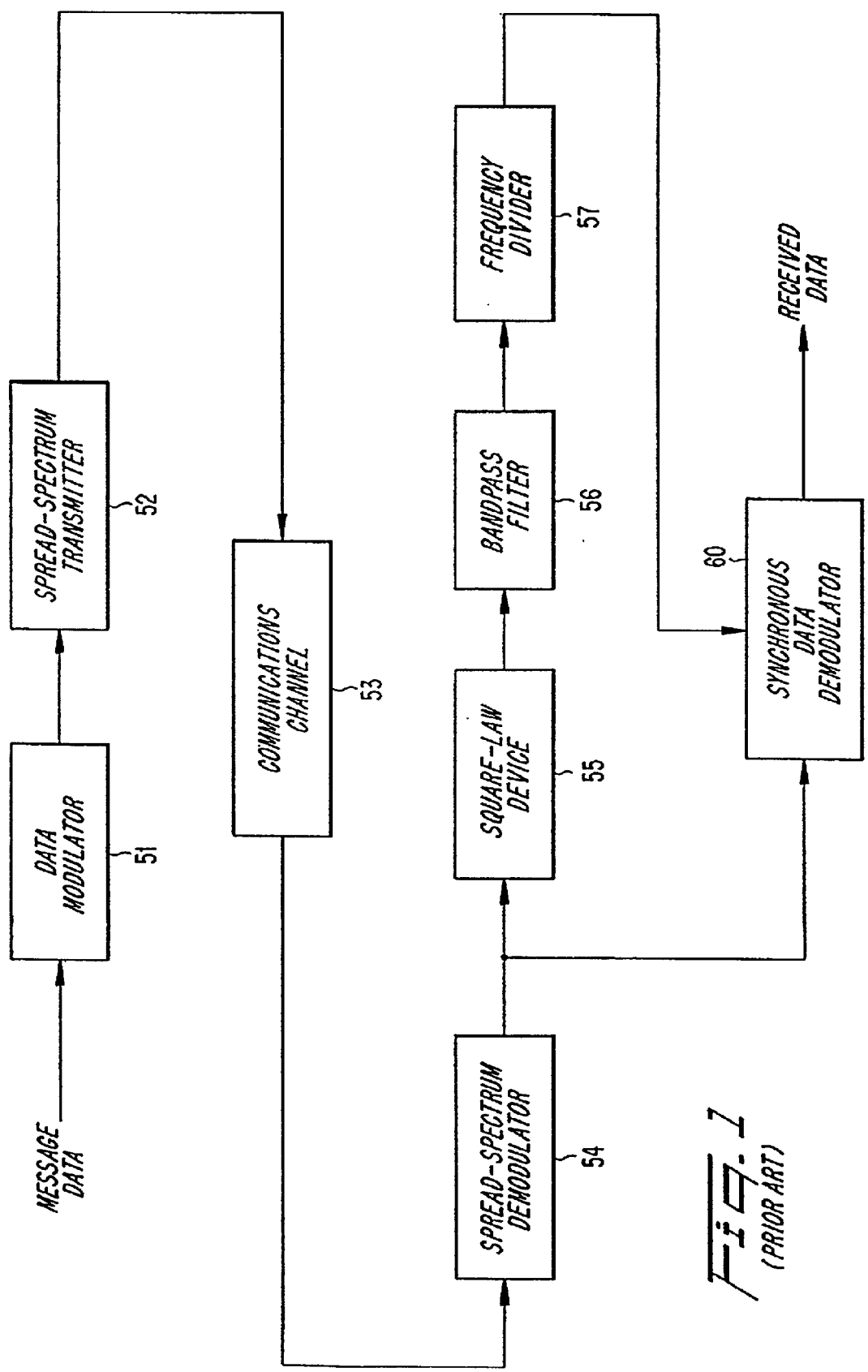
FIG. 1 is a prior art scheme for synchronously recovering message data.

Reference is now made in detail to the present preferred embodiments of the invention, examples of which are illustrated in the accompanying drawings, wherein like reference numerals indicate like elements throughout the several views.

The spread-spectrum communications and orthogonal code synchronization system and method of the present invention is an extension of an invention disclosed in a U.S. patent application entitled, SYNCHRONOUS-SPREAD-SPECTRUM COMMUNICATIONS SYSTEM AND METHOD, by Donald L. Schilling, having Ser. No. 07/626,109 and filing date of Dec. 14, 1990, now issued U.S. Pat. No. 5,228,056. For completeness of disclosure, the following discussion includes the disclosure presented in the original patent application, and subsequently goes into a discussion of orthogonal code synchronization according to the present invention.

The spread spectrum signals of the present invention are designed to be "transparent" to other users, i.e., spread spectrum signals are designed to provide negligible interference to the communication of other existing users. The presence of a spread spectrum signal is difficult to determine. This characteristic is known as low probability of interception (LPI) and low probability of detection (LPD). The LPI and LPD features of spread spectrum allow transmission between users of a spread spectrum CDMA communications system without the existing users of the mobile cellular system experiencing significant interference. The present invention makes use of LPI and LPD with respect to predetermined channels in the mobile cellular system or in the fixed-service microwave system. By having the power level of each spread spectrum signal below the predetermined level, then the total power from all spread spectrum used within a cell does not interfere with mobile users in a mobile cellular system, or with microwave users in the fixed-service microwave system.

Spread spectrum is also "jam" or interference resistant. A spread spectrum receiver spreads the spectrum of the interfering signal. This reduces the interference from the interfering signal so that it does not noticeably degrade performance of the spread spectrum system. This feature of interference reduction makes spread spectrum useful for commercial communications, i.e., the spread spectrum waveforms can be overlaid on top of existing narrowband signals.

The present invention employs direct sequence spread spectrum, which uses a phase modulation technique. Direct sequence spread spectrum takes the power that is to be transmitted and spreads it over a very wide bandwidth so that the power per unit bandwidth (watts/hertz) is minimized. When this is accomplished, the transmitted spread spectrum power received by a mobile cellular user or a microwave user, having a relatively narrow bandwidth, is only a small fraction of the actual transmitted power.

In a fixed-service microwave system, by way of example, if a spread spectrum signal having a power of 10 milliwatts is spread over a fixed-service microwave bandwidth of 10 MHz and a microwave user employs a communication system having a channel bandwidth of only 2 MHz, then the effective interfering power due to one spread spectrum signal, in the narrow band communication system, is reduced by the factor of 10 MHz/2 MHz. For fifty concurrent users of spread spectrum, the power of the interfering signal due to spread spectrum is increased by fifty.

The feature of spread spectrum that results in interference reduction is that the spread spectrum receiver actually spreads the received energy of any interferer over the same wide bandwidth, 10 MHz in the present example, while compressing the bandwidth of the desired received signal to its original bandwidth. For example, if the original bandwidth of the desired message data is only 30 kHz, then the power of the interfering signal produced at a base station is reduced by 10 MHz/30 kHz.

Direct sequence spread spectrum achieves a spreading of the spectrum by modulating the original signal with a very wideband signal relative to the data bandwidth. This wideband signal is chosen to have two possible amplitudes, +1 and −1, and these amplitudes are switched, in a "pseudo-random" manner, periodically. Thus, at each equally spaced time interval, a decision is made as to whether the wideband modulating signal should be +1 or −1. If a coin were tossed to make such a decision, the resulting sequence would be truly random. However, in such a case, the receiver would not know the sequence a-priori and could not properly receive the transmission. Instead, a chip-code generator generates electronically an approximately random sequence, called a pseudo-random sequence, which is known a-priori to the transmitter and receiver.

Code Division Multiple Access

Code division multiple access (CDMA) is a direct sequence spread spectrum system in which a number, at least two, of spread-spectrum signals communicate simultaneously, each operating over the same frequency band. In a CDMA system, each user is given a distinct chip code. This chip code identifies the user. For example, if a first user has a first chip code, $g_1(t)$, and a second user has a second chip code, $g_2(t)$, etc., then a receiver, desiring to listen to the first user, receives at its antenna all of the energy sent by all of the users. However, after despreading the first user's signal, the receiver outputs all the energy of the first user but only a small fraction of the energies sent by the second, third, etc., users.

CDMA is interference limited. That is, the number of users that can use the same spectrum and still have acceptable performance is determined by the total interference power that all of the users, taken as a whole, generate in the receiver. Unless one takes great care in power control, those CDMA transmitters which are close to the receiver cause overwhelming interference. This effect is known as the "near-far" problem. In a mobile environment the near-far problem could be the dominant effect. Controlling the power of each individual mobile remote user is possible so that the received power from each mobile remote user is the same. This technique is called "adaptive power control". See U.S. Pat. No. 5,093,840, having issue date of Mar. 3, 1992, entitled, ADAPTIVE POWER CONTROL FOR A SPREAD SPECTRUM SYSTEM AND METHOD, by Donald L. Schilling, which is incorporated herein by reference.

The spread spectrum communications system of the present invention is a code division multiple access (CDMA) system. Spread spectrum CDMA can significantly increase the use of spectrum. With CDMA, each user in a cell uses the same frequency band. However, each CDMA signal has a separate pseudo random code which enables a receiver to distinguish a desired signal from the remaining signals. Remote users in adjacent cells use the same frequency band and the same bandwidth, and therefore "interfere" with one another. A received signal may appear somewhat noisier as the number of users' signals received by a PCN base station increases.

Each unwanted user's signal generates some interfering power whose magnitude depends on the processing gain. Remote users in adjacent cells increase the expected interfering energy compared to remote users within a particular cell by about 50%, assuming that the remote users are uniformly distributed throughout the adjacent cells. Since the interference increase factor is not severe, frequency reuse is not employed.

Each spread spectrum cell can use a full 10 MHz band for transmission and a full 10 MHz band for reception. Hence, using a chip rate of five million chips per second and a coding data rate of 4800 bps results in approximately a processing gain of 1000 chips per bit. It is well known to those skilled in the art that the maximum number of CDMA remote users that can concurrently use a frequency band is approximately equal to the processing gain.

Orthogonal Codes

A pilot on the return link is now considered to be practical, because it decreases the C/I that is required to achieve the desired $E_b/N_o$, as disclosed in U.S. Pat. No. 5,506,864 and U.S. Pat. No. 5,544,156. This improvement derives from the ability to use synchronous or coherent detection. As described in these patents, the use of a pilot or generic chip-code improves the performance of both orthogonal and non-orthogonal coded links. Since, for orthogonal channels, each mobile requires unique pilot and information codes, the number of active users is reduced by two. If there are a limited number of codes this could have a serious impact. U.S. Pat. No. 5,506,864 uses the pilot from the mobile to measure the distance between the base station and the mobile using non-orthogonal codes. This invention expands upon that patent to include orthogonal codes and uses the knowledge of the distance to the mobile terminal to adjust the phase of the information channel to make it align with the other mobile signals arriving at the base station. The mobile receives the pilot or generic chip code signal from the base station and uses the timing and phase of the base station pilot signal to originate the remote-pilot signal it sends to the base station. That is, the returned pilot has no delay going through the mobile; the returned pilot looks like a radar reflection off the mobile. It is, of course, stronger in signal strength and, because there are many remote pilots that will be returned to the base station, it is a different but similar pseudo-noise code than the base station pilot pseudo-noise code.

The base station receives the pilot signals from all active mobiles and measures the phase difference, when possible down to 0.1 chip, between the returned pseudo-noise sequence and the transmitted pseudo-noise sequence for each mobile station. What is measured is the round trip delay; the actual distance is one half this number measured in chips, to 0.1 chip. This information is transmitted to the mobile user and, if the mobile user is operating in an orthogonal mode on the return link, the mobile user uses this information to adjust the phase of the PN code on the remote message to arrive at the base station at a is predetermined time, as established by the base station. Therefore, the PN code of the remote pilot and the remote user message channels are at different phases, but they both have the same carrier signal and the pilot carrier can be used to generate a reference for coherent detection in the user message channel.

The data sampling point is usually tied to the repetition rate of the PN sequence and will be adjusted in phase to comply with the data timing on the user message channel. Therefore, it is possible to significantly reduce the mutual interference caused by the user message channels that are in communication with a common base station.

The interference from the mobiles in adjacent cells is not orthogonal and appears as non-orthogonal interference. Most orthogonal code CDMA systems utilize sectored antennas to obtain code reuse and reduce the interference. Therefore, at the edge of the cell, across the face of the sector, the mobiles in each cell transmit at maximum power and cause radiation into both cells at the maximum energy. However, as the mobile users in the adjacent cell move toward their base station, they reduce their power to keep it the same as when they were on the edge of the cell. Assuming a fourth power attenuation curve, they reduce their power at a fourth power vs. distance rate and since they are also moving away from the base station being interfered with, their reduced transmitted power level, reduced as the fourth power, travels a further distance which is also decreased at the fourth power factor. This doubles the effect of the fourth power factor which means the adjacent cell interference from mobile users is much less than if power control were not used. Therefore, the external interference, i.e., interference from mobile users operating with other base stations, introduced at the primary base station is down at least 6 db from the interference caused within the cell from other mobile users operating with the primary base station. Therefore, it is possible to increase the number of users by a factor of four. As stated previously, each active mobile user transmits a pilot channel and an information or message channel. The information channels are adjusted so that they are orthogonal when they arrive at the base station. The pilot channels, however, are not orthogonal but, after the information channel is functioning, the pilot channel power is reduced by 6 db. Therefore, even with the external interference and the pilot channels, the capacity is doubled as the result of the present invention.

Still another improvement is possible by shifting the phase of the remote pilot after acquisition to coincide with the user information channel. When this is accomplished the remote pilots also become orthogonal and the only interference is the external interference that is radiated into the prime cell from users in adjacent cells. As stated previously, this interference is down at least 6 db, resulting in a fourfold increase in capacity. The code tracking on the reverse link becomes more difficult since the error is generated in the base station and the oscillator that is controlled by this error voltage is in the mobile station. Therefore, the forward link has to be used to transmit this error voltage to the mobile station. Generally, the range changes relatively slowly and this remote control of the mobile code clock is not a problem. When sudden fluctuations occur that are significant enough to cause rapid severe misalignment, the mobile shifts the remote pilot code back to the acquisition mode. Upon reacquisition and completion of the necessary adjustments to bring the information channel back into proper alignment, the mobile switches back to the orthogonal tracking mode. Therefore the non-orthogonal remote pilots are only "on" a small portion of the time and the resulting impact on capacity is small. Capacity should still be close to four times that of a non-orthogonal code system if there are enough orthogonal codes in the code set to actually capitalize on this advantage.

Synchronous Spread Spectrum Communications

Figure 2A:
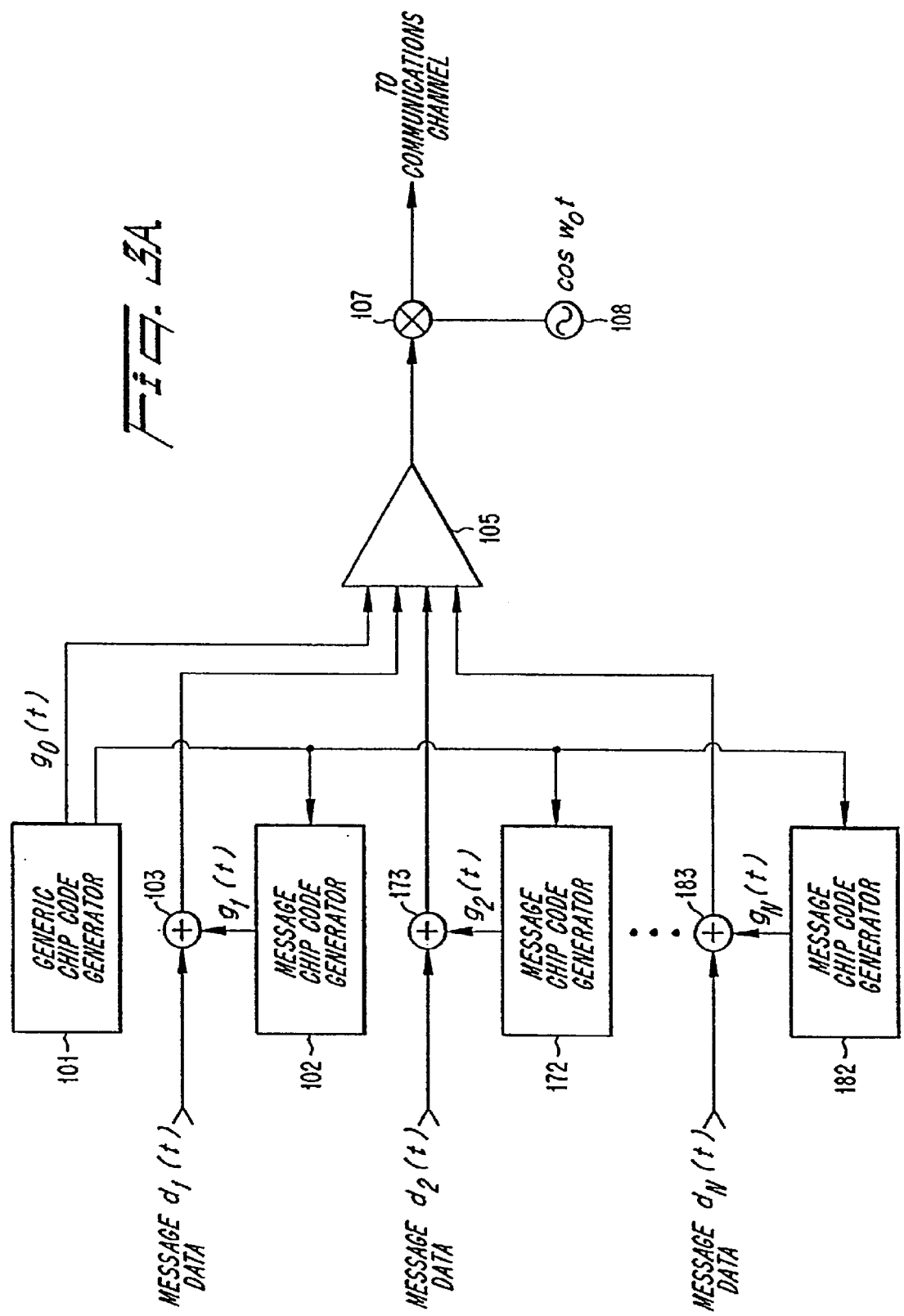
FIG. 2 shows a synchronous spread-spectrum system with a bit synchronizer, synchronized to a generic chip code generator according to the present invention.

As illustratively shown in FIG. 2, a spread spectrum code division multiple access (CDMA) communications system for use over a communications channel 110 is provided comprising generic means, message means, spreading means, summer means, transmitting means, generic-spread-spectrum-processing means, message-spread-spectrum-processing means, acquisition and tracking means, detection means and synchronous means. The generic means and message means are embodied as a transmitter-generic-chip-code generator 101 and transmitter-message-chip-code generator 102. The spreading means is shown as an EXCLUSIVE-OR device 103, which may be an EXCLUSIVE-OR gate. Summer means is a combiner 105 and the transmitting means includes a transmitter which is embodied as a signal source 108 coupled to modulator 107. The transmitter-message-chip-code generator 102 is coupled to the EXCLUSIVE-OR device 103. The transmitter-generic-chip-code generator 101 is shown coupled to the transmitter-message-chip-code generator 102 and the source for message data. The EXCLUSIVE-OR device 103 and the transmitter-generic-chip-code generator 101 are coupled to the combiner 105. The modulator 107 is coupled between the combiner 105 and the communications channel 110.

At the receiver the generic-spread-spectrum-processing means is embodied as the receiver-generic-chip-code generator 121, the generic mixer 123 and the generic-bandpass filter 125. The generic mixer 123 is coupled between the receiver-generic-chip-code generator 121 and the generic-bandpass filter 125. The message-spread-spectrum-processing means is embodied as a receiver-message-chip-code generator 122, a message mixer 124 and a message-bandpass filter 126. The message mixer 124 is coupled between the receiver-message-chip-code generator 122 and the message-bandpass filter 126. A power splitter 115 is coupled between the communications channel 110, and the generic mixer 123 and the message mixer 124.

The acquisition and tracking means is embodied as an acquisition and tracking circuit 131. The acquisition and tracking circuit 131 is coupled to an output of the generic-bandpass filter 125, and to the receiver-generic-chip-code generator 121. The receiver-message-chip-code generator 122 preferably is coupled to the receiver-generic-chip-code generator 121.

The detection means is embodied as a detector 139. The detector 139 is coupled to the message-bandpass filter 126 and the generic-bandpass filter 125. The detector 139 may be a nonsynchronous detector such as an envelope detector or square-law detector. Alternatively, the detector 139 may be a synchronous detector, which uses a recovered-carrier signal from the generic-bandpass filter 125.

The synchronous means includes bit means, a lowpass filter 128 and electronic switch 130. The bit means is embodied as a bit synchronizer 129. The lowpass filter 128 and electronic switch 130 are coupled to the bit synchronizer 129. The bit synchronizer 129, as shown in FIG. 2, preferably is coupled to the receiver-generic-chip-code generator 121. Alternatively, the bit synchronizer 129 may be coupled to an output of the detector 139.

The transmitter-generic-chip-code generator 101 generates a generic-chip-code signal, $g_0(t)$, and the transmitter-message-chip-code generator 102 generates a message-chip-code signal, $g_1(t)$. Synchronous timing of the message data, $d_1(t)$, and the message-chip-code signal, in FIG. 2, is provided by the generic-chip-code signal, although other sources can be used such as a common clock signal for synchronization. The EXCLUSIVE-OR device 103 generates a spread-spectrum signal by spread-spectrum processing message data with the message-chip-code signal. The spread-spectrum processing may be accomplished by modulo-2 adding the message data to the message-chip-code signal. The combiner 105 combines the generic-chip-code signal with the spread-spectrum-processed signal. The combined generic-chip-code signal and spread-spectrum-processed signal may be a multilevel signal, having the instantaneous voltage levels of the generic-chip-code signal and the spread-spectrum-processed signal.

The modulator 107, as part of the transmitter, modulates the combined generic-chip-code signal and spread-spectrum-processed signal by a carrier signal, $\cos \omega_o t$, at a carrier frequency, $f_o$. The modulated generic-chip-code signal and spread-spectrum processed signal are transmitted over the communications channel 110 as a code division multiple access (CDMA) signal, $x_c(t)$. Thus, the CDMA signal includes the generic-chip-code signal and the spread-spectrum-processed signal as if they were each modulated separately, and synchronously, on separate carrier signals having the same carrier frequency, $f_o$, and transmitted over the communications channel.

At a receiver, the generic-spread-spectrum-processing means recovers the carrier signal, cos $\omega_o t$, from the CDMA signal, $x_c(t)$, and the message-spread-spectrum-processing means despreads the CDMA signal, $x_c(t)$, as a modulated-data signal, $d_1(t)$. More particularly, referring to FIG. 2, the CDMA signal received from the communications channel 110, is divided by power splitter 115. The receiver-generic-chip-code generator 121 generates a replica of the generic-chip-code signal, $g_0(t)$. The generic mixer 123 uses the replica of the generic-chip-code signal for despreading the CDMA signal, $x_c(t)$, from the power splitter 115, as a recovered-carrier signal. The spread-spectrum channel, of the CDMA signal having the generic-chip-code signal, $g_0(t)$ cos $\omega_o t$, generally does not include data so that despreading the CDMA signal produces the carrier signal, only. The generic-bandpass filter 125 filters the recovered-carrier signal at the carrier frequency, or equivalently, at an intermediate frequency. In comparison to the message-bandpass filter 126 which has a bandwidth sufficiently wide for filtering a modulated-data signal, the generic-bandpass filter 125 can have a very narrow bandwidth for filtering the recovered-carrier signal. The very narrow bandwidth of the generic-bandpass filter 125 assists in extracting the recovered-carrier signal from noise.

The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131.

The receiver-message-chip-code generator 122 generates a replica of the message-chip-code signal, $g_1(t)$. The replica of the message-chip-code signal, $g_1(t)$, is synchronized to the replica of the generic-chip-code signal, $g_0(t)$, from the receiver-generic-chip-code generator 121. Thus, the receiver-message-chip-code generator 122, via synchronization to the receiver-generic-chip-code generator 121, has the same synchronization as the transmitter-message-chip-code generator 102 via synchronization to the transmitter-generic-chip-code generator 101. Accordingly, the spread-spectrum communications channel having the generic-chip-code signal provides coherent spread-spectrum demodulation of the spread-spectrum channels with data.

The message mixer 124 uses the replica of the message-chip-code signal for despreading the CDMA signal from the power splitter 115, to generate a modulated-data signal, $d_1(t)$ cos $\omega_o t$. The modulated-data signal effectively is the message data modulated by the carrier signal. The message-bandpass filter 126 filters the modulated-data signal at the carrier frequency, or equivalently at an intermediate frequency (IF). Down converters, which convert the modulated-data signal to an IF, optionally may be used without altering the cooperative functions or teachings of the present invention.

The detector 139 demodulates the modulated-data signal as a detected signal. The detected signal is filtered through lowpass filter 128, sampled by electronic switch 130 and outputted as received data, $d_1(t)$. The received data, without errors, are identical to the message data. The lowpass filter 128 and electronic switch 130 operate in an "integrate and dump" function, respectively, under the control of the bit synchronizer 129.

The bit synchronizer 129 controls the integrating and dumping of lowpass filter 128 and electronic switch 130. The bit synchronizer 129 preferably derives synchronization using the replica of the generic-chip-code signal from the receiver-generic-chip-code generator 121 as illustrated in FIG. 2. The bit synchronizer 129 also may derive synchronization from an output of the detector 139, as illustrated in FIG. 1.

In a preferred embodiment, the bit synchronizer 129 receives the replica of the generic-chip-code signal, $g_0(t)$, from the receiver-generic-chip-code generator 121. The replica of the generic-chip-code signal, by way of example, may include a chip codeword having 8250 chips. Assuming that there are eleven bits per chip codeword, then there are 750 chips per bit of data. Since the replica of the generic-chip-code signal provides information to the bit synchronizer 129 as to where the chip codeword begins, the bit synchronizer 129 thereby knows the timing of the corresponding bits for synchronization.

The present invention further may include transmitting as the CDMA signal, a plurality of spread-spectrum-processed signals for handling a plurality of message data. In this case the invention includes a plurality of message means and a plurality of spreading means. Referring to FIG. 3A, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. In FIG. 3A, the plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message data $d_1(t)$, $d_2(t)$, . . . , $d_N(t)$ with the plurality of message-chip-code signals $g_1(t)$, $g_2(t)$, . . . , $g_N(t)$, respectively. More particularly, the first message data, $d_1(t)$, are modulo-2 added with the first message-chip-code signal, $g_1(t)$, the second message data, $d_2(t)$, are modulo-2 added with the second message-chip-code signal, $g_2(t)$, through the $N^{th}$ message data, $d_N(t)$, which are modulo-2 added with the $N^{th}$ message-chip-code signal, $g_N(t)$.

The transmitter-generic-chip-code generator 101 is coupled to the plurality of transmitter-message-chip-code generators and the source for the plurality of message data, $d_1(t)$, $d_2(t)$, . . . $d_N(t)$. The generic-chip-code signal $g_0(t)$, in a preferred embodiment, provides synchronous timing for the plurality of message-chip-code signals $g_1(t)$, $g_2(t)$, . . . , $g_N(t)$, and the plurality of message data $d_1(t)$, $d_2(t)$, . . . , $d_N(t)$.

The combiner 105 combines the generic-chip-code signal and the plurality of spread-spectrum-processed signals, by linearly adding the generic-chip-code signal with the plurality of spread-spectrum-processed signals. The combined signal typically is a multilevel signal, which has the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, cos $\omega_o t$, at a carrier frequency, $f_o$. The modulated generic-chip-code signal and the plurality of spread-spectrum processed signals are transmitted over the communications channel 110 as a CDMA signal, $x_c(t)$. The CDMA signal, $x_c(t)$ has the form:

$$x_c(t) = g_0(t) + \sum_1^N [g_i(t) + d_i(t)]\cos\omega_0 t$$

Thus, the CDMA signal includes the generic-chip-code signal and the plurality of spread-spectrum-processed signals as if they were each modulated separately, and synchronously, on separate carrier signals with the same carrier frequency, $f_o$, and transmitted over the communications channel.

Figure 3B:
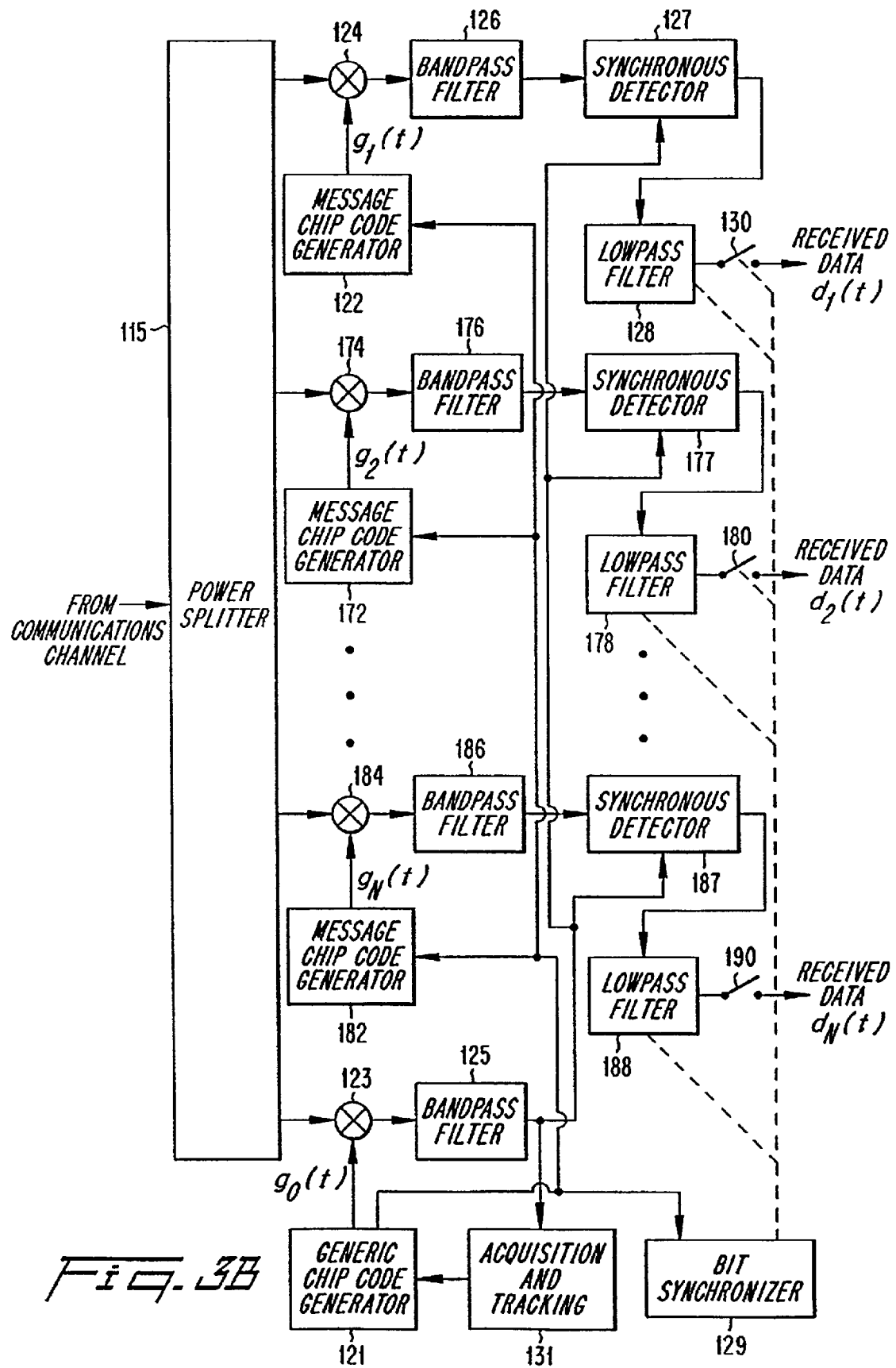
FIG. 3B shows a spread spectrum receiver using a synchronous detector for receiving a plurality of spread-spectrum processed signals.

The present invention includes receiving a CDMA signal which has a plurality of spread-spectrum-processed signals. The receiver further includes a plurality of message-spread-spectrum processing means, a plurality of detection means and a plurality of synchronous means. The plurality of message-spread-spectrum-processing means, as shown in FIG. 3B, may be embodied as a plurality of message-chip-code generators, a plurality of message mixers and a plurality of message-bandpass filters. A mixer is connected between a respective message-chip-code generator and message-bandpass filter. The plurality of message mixers is coupled to the power splitter 115. More particularly, the plurality of message-chip-code generators is shown embodied as first message-chip-code generator 122, second message-chip-code generator 172, through $N^{th}$ message-chip-code generator 182. The plurality of message mixers is shown as first message mixer 124, second message mixer 174 through $N^{th}$ message mixer 184. The plurality of message-bandpass filters is shown as first message-bandpass filter 126, second message-bandpass filter 176, through $N^{th}$ message-bandpass filter 186.

The plurality of detection means may be embodied as a plurality of synchronous detectors which is shown as first synchronous detector 127, second synchronous detector 177 through $N^{th}$ synchronous detector 187. Each of the plurality of synchronous detectors are coupled to one of the plurality message-bandpass filters.

The plurality of synchronous means may include a bit synchronizer 129, a plurality of lowpass filters and a plurality of electronic switches. The plurality of lowpass filters is shown as first lowpass filter 128, second lowpass filter 178, through $N^{th}$ lowpass filter 188. The plurality of electronic switches is shown as first electronic switch 130, second electronic switch 180 through $N^{th}$ electronic switch 190. Each of the plurality of synchronous detectors is coupled to an output of the generic-bandpass filter 125. The recovered-carrier signal from the generic-bandpass filter 125 serves as the reference signal for synchronously demodulating each of the plurality of message-data signals by the plurality of synchronous detectors, as a plurality of received data, $d_1(t), d_2(t), \ldots, d_N(t)$.

The detection means alternatively may be embodied as a plurality of nonsynchronous detectors, such as envelope detectors 139, 189, 199, as shown in FIG. 3C. Typically, the nonsynchronous detectors do not require the recovered-carrier signal.

The bit synchronizer 129 derives timing from the replica of the generic-chip-code signal, $g_0(t)$, and controls the timing of the integrating and dumping functions of the plurality lowpass filters and the plurality of electronic switches.

With the use of the invention as embodied in FIG. 3B, a generic-spread-spectrum channel, as part of the CDMA signal, provides the recovered-carrier signal, as discussed previously. The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131. The receiver-generic-chip-code generator 121 generates a replica of the generic-chip-code signal, $g_0(t)$, which provides timing to bit synchronizer 129 and to the plurality of receiver-message-chip-code generators 122, 172, 182.

The present invention also includes a method for synchronously demodulating a CDMA signal. Message data are input to the spreading means. Referring to FIG. 4, the method comprises the steps of generating 403 a generic-chip-code signal. The method further includes generating 405 message data synchronized to the generic-chip-code signal, and generating 407 a message-chip-code signal synchronized to the generic-chip-code signal. Message data are processed, using a spread-spectrum modulator, with the message-chip-code signal to generate a spread-spectrum-processed signal. The generic-chip-code signal is combined 409 with the spread-spectrum-processed signal. The method transmits 411 the combined generic-chip-code signal and spread-spectrum-processed signal on a carrier signal over the communications channel as a CDMA signal.

At a receiver, the method includes recovering 413 the carrier signal from the CDMA signal and despreading 415 the CDMA signal as a modulated-data signal. The recovered-carrier signal is used to synchronize the step of despreading the CDMA signal and to optionally synchronously demodulate 417 and output 419 the modulated-data signal as received data.

In use of the system as set forth in FIG. 3A, the transmitter-generic-chip-code generator 101 generates the generic-chip-code signal, $g_0(t)$. Message data are spread-spectrum processed by the EXCLUSIVE-OR device 103 with message-chip-code signal, $g_1(t)$, from transmitter-message-chip-code generator 102. The combiner 105 combines the generic-chip-code signal with the spread-spectrum-processed signal. The combined signal may be, for example, a multilevel signal, which is generated by linearly adding the voltage levels of the generic-chip-code signal and the spread-spectrum-processed signal, or by adding the voltage levels of the generic-chip-code signal with a plurality of spread-spectrum-processed signals. The transmitter transmits on a carrier signal having a carrier frequency, $f_o$, the combined generic-chip-code signal and the plurality of spread-spectrum-processed signals. The CDMA signal is transmitted through the communications channel 110.

At the receiver, as shown in FIG. 3B, the generic-spread-spectrum-processing means, embodied as the receiver-generic-chip-code generator 121, the generic mixer 123 and the generic-bandpass filter 125, cooperatively operate to recover the carrier signal from the CDMA signal. The message-spread-spectrum-processing means, embodied as the receiver-message-chip-code generator 122, the message mixer 124 and the message-bandpass filter 126, cooperatively despread the CDMA signal as the modulated-data signal. The receiver-message-chip-code generator 122 preferably is synchronized to the replica of the generic-chip-code signal from the receiver-generic-chip-code generator 121. A plurality of receiver-message-chip-code generators may be employed, synchronized to the replica of the generic-chip-code signal. The synchronous means, embodied as the synchronous detector 127 synchronized to the recovered-carrier signal, demodulates the modulated-data signal as received data.

The received data are integrated and dumped by lowpass filter 128 and electronic switch 130, under control of the bit synchronizer 129. The bit synchronizer 129 preferably uses the replica of the generic-chip-code signal for synchronizing the integrate and dump functions.

Spread Spectrum Geolocation

A spread spectrum code division multiple access (CDMA) communications and geolocation system and method for use over a communications channel is provided comprising at least one base station and a plurality of remote units. The remote units may be mobile or in a fixed, stationary location. Message data are communicated between the base stations and the remote units. Message data include, but are not limited to, digitized voice, computer data, facsimile data, video data, etc. The base station communicates base-message data to the plurality of remote units. A remote unit communicates remote-message data to the base station. Base-message data are defined herein to be message data originating from a base station, and remote-message data are defined herein to be message data originating from a remote unit. The following discussion is of a preferred embodiment with the range between the base station and remote unit being determined at the base station. The roles of the base station and remote unit can be interchanged, as an equivalent to those skilled in the art, with the range being determined at the remote unit.

In the exemplary arrangement shown in FIG. 5, a base station includes base-spreading means, base-generic means, base-combiner means, base-transmitter means, and base antenna. The term "base" is used as a prefix to indicate an element is located at the base station, or that a signal originates from a base station.

The base-spreading means spread-spectrum processes the base-message data, $d_1(t)$. The base-spreading means is embodied as a base-spread-spectrum modulator. The base-spread-spectrum modulator is shown as a message-chip-code generator 502 and an EXCLUSIVE-OR gate 503. The EXCLUSIVE-OR gate 503 is coupled to the message-chip-code generator 502. The message-chip-code generator 502 uses a chip codeword for generating a chip-code sequence for spread-spectrum processing base-message data, $d_1(t)$. The chip-code sequence from message-chip-code generator 502 is spread-spectrum processed by modulo addition by EXCLUSIVE-OR gate 503. Many equivalent circuits can be used for the base-spread-spectrum modulator, including but not limited to, product devices for multiplying the chip-code sequence by the base-message data, matched filters and surface acoustic wave devices which have an impulse response matched to the chip-code sequence, as is well known to those skilled in the art.

The base-generic means generates a base-generic-chip-code signal. The term "generic" is used as a prefix to indicate that the generic-chip-code signal is an unmodulated, or low data rate, direct-sequence spread-spectrum signal, which can serve as a pilot channel. The pilot channel allows a user to acquire timing, and provides a phase reference for coherent demodulation. The base-generic means is embodied as a base-generic-chip-code generator 501. The base-generic-chip-code generator 501 generates a base-generic-chip-code signal, using a chip codeword commonly shared with all remote units communicating with the base station. The message-chip-code generator 501 is coupled to the base-generic-chip-code generator 502, for deriving common timing. Alternatively, a common clock can be used for providing the timing signal to the message-chip-code generator 502 and the base-generic-chip-code generator 501.

The base-combiner means combines the base-generic-chip-code signal with the spread-spectrum-processed-base-message data, to generate a base-CDMA signal. The base-combiner means is embodied as a base-combiner 505. The base combiner 505 is coupled to the base-generic-chip-code generator 501 and the EXCLUSIVE-OR gate 503. The base combiner 505 linearly adds the base-generic-chip-code signal with the spread-spectrum-processed-base-message data from EXCLUSIVE-OR gate 503. The resulting signal at the output of the base combiner 505 is a code division multiple access (CDMA) signal, denoted herein as the base-CDMA signal. Selected variations of nonlinear combining also may be used, so long as the resulting base-CDMA signal can have its channels detected at a spread-spectrum receiver.

The base-transmitter means transmits the base-CDMA signal from the base station to a remote unit. The base-transmitter means is embodied as a signal source 508 and product device 507. The product device 507 is coupled between the base combiner 505 and the signal source 508. The signal source 508 generates a first carrier signal at a first carrier frequency $f_1$. The base-CDMA signal, from the output of the base combiner 505, is multiplied by the first carrier signal by product device 507. Other transmitting devices are well known in the art for putting a desired signal at a selected carrier frequency.

The base antenna 509 is coupled through an isolator 513 to the base-transmitter means. The base antenna 509 radiates the base-CDMA signal at the first carrier frequency.

As illustratively shown in FIG. 6, a remote unit includes a remote antenna 511, remote-detection means, remote-spreading means, remote-combiner means, and remote-transmitter means. Each remote unit also may include remote-generic means. The term "remote" is used as a prefix to indicate an element is located at a remote unit, or that a signal originates from the remote unit. The remote antenna 511 receives the base-CDMA signal radiated from the base station.

The remote-detection means is coupled to the remote antenna 511. The remote-detection means detects the base-generic-chip-code signal embedded in the base-CDMA signal. Using the detected-base-generic-chip-code signal, the remote-detection means recovers the base-message data communicated from the base station. A remote unit can retransmit the detected-base-generic-chip-code signal, or optionally, can have remote-generic means generate a different remote-generic-chip-code signal.

In FIG. 6, the remote-detection means is embodied as a product device 536, bandpass filter 537, acquisition and tracking circuit 538, generic-chip-code generator 539, message-chip-code generator 541, product device 542, bandpass filter 543, data detector 544, lowpass filter 545, and bit synchronizer 540. As is well known in the art, other devices and circuits can be used for the same function, including but not limited to, matched filters, surface acoustic wave devices, etc. This circuit acquires and tracks the base-generic-chip-code signal embedded in the base-CDMA signal. The base-CDMA signal is received at remote antenna 511, and passes through isolator 534 and power splitter 535. The base-generic-chip-code signal is detected using product device 536, bandpass filter 537, acquisition and tracking circuit 538 and generic-chip-code generator 539. The function of this circuit is as described in the previous section. The detected-base-generic-chip-code signal is used to recover the base-message data embedded in the base-CDMA signal, using message-chip-code generator 541, product device 542, bandpass filter 543, data detector 544, lowpass filter 545, and synchronizer 540. The data detector 544 may operate coherently or noncoherently. The detected base-message data is outputted as detected data, $d_{R1}(t)$. If the base-generic-chip-code signal is to be combined as part of the remote-CDMA signal, then generic-chip-code generator 546 is not required, since the base-generic-chip-code signal is available at the output of the generic-chip-code generator 539. If a remote-generic-chip-code signal, which is different from the base-generic-chip-code signal, is to be used, then the generic-chip-code generator 546 can be used for generating the remote-generic-chip-code signal. In the latter case, the remote-generic-chip-code signal is clocked or synchronized with the detected base-generic-chip-code signal. For purposes of discussion, the remote-generic-chip-code signal is considered to be sent from the remote unit to the base station, with the understanding that the remote-generic-chip-code signal can be identical to, or one and the same as, the detected base-generic-chip-code signal.

The remote-spreading means spread-spectrum processes remote-message data. The remote-spreading means is embodied as a remote-spread-spectrum modulator. The remote-spread-spectrum modulator is shown as a message-chip-code generator 548 and an EXCLUSIVE-OR gate 547. The EXCLUSIVE-OR gate 547 is coupled to the message-chip-code generator 548. The message-chip-code generator 548 uses a chip codeword for generating a chip-code sequence for spread-spectrum processing remote-message data, $d_2(t)$. The chip-code sequence from message-chip-code generator 548 is spread-spectrum processed by modulo addition by EXCLUSIVE-OR gate 547. Many equivalent circuits can be used for the remote-spreading means, including but not limited to, product devices for multiplying the chip-code sequence by the base-message data, matched filters and surface acoustic wave devices, as is well known to those skilled in the art.

The remote-generic-chip-code signal and the spread-spectrum-processed-remote-message data are combined by the remote-combiner means, as a remote-CDMA signal. The remote-combiner means is embodied as a remote-combiner 549. The remote combiner 549 is coupled to the EXCLUSIVE-OR gate 547, and the remote-generic-chip-code generator 546, or alternatively to the generic-chip-code generator 539. The remote combiner 549 linearly adds the remote-generic-chip-code signal with the spread-spectrum-processed-remote-message data from EXCLUSIVE-OR gate 547. The resulting signal at the output of the remote combiner 549 is a code division multiple access (CDMA) signal, denoted herein as the remote-CDMA signal. Selected variations of nonlinear combining also may be used, so long as the resulting remote-CDMA signal can have its channels detected at a spread-spectrum receiver.

The remote unit also includes the remote-transmitter means for transmitting the remote-CDMA signal from the remote unit to the base station. The remote-transmitter means is embodied as a signal source 551 and product device 550. The product device 550 is coupled between the remote combiner 549 and the signal source 551. The signal source 551 generates a carrier signal at a second carrier frequency $f_2$. The remote-CDMA signal, from the output of the remote combiner 549, is multiplied by the second carrier signal by product device 550. Other transmitting devices are well known in the art for putting a desired signal at a selected carrier frequency. The second carrier frequency may be the same as, or different from, the first carrier frequency.

The remote antenna 511 is coupled through an isolator 534 to the remote-transmitter means. The remote antenna 511 radiates the remote-CDMA signal at the second carrier frequency.

Each of the base stations further includes base-detection means and range means. The base-detection means is coupled to the base antenna 509 through isolator 513 and power splitter 515. The base detection means detects the remote-generic-chip-code signal embedded in the remote-CDMA signal. The base-detection means, as illustrated in FIG. 5, may be embodied as a base detector which may includes a product device 523, bandpass filter 525, acquisition and tracking circuit 531, generic-chip-code generator 521, message-chip-code generator 522, product device 524, bandpass filter 526, data detector 527, lowpass filter 528, and bit synchronizer 529. As is well known in the art, the base detection means may be embodied with other devices and circuits which perform the same function, including but not limited to, matched filters, surface acoustic wave devices, etc. This circuit acquires and tracks the remote-generic-chip-code signal embedded in the remote-CDMA signal. The remote-CDMA signal is received at base antenna 509, and passes through isolator 513 and power splitter 515. The remote-generic-chip-code signal is detected using product device 523, bandpass filter 525, acquisition and tracking circuit 531 and generic-chip-code generator 521. The function of this circuit is as previously described. The detected-remote-generic-chip-code signal is used to recover the remote-message data embedded in the remote-CDMA signal, using message-chip-code generator 522, product device 524, bandpass filter 526, data detector 527, lowpass filter 528, bit and synchronizer 529. The data detector 527 may operate coherently or noncoherently. The detected remote-message data is outputted as detected data, $d_{R2}(t)$. Thus, the base detector recovers, using the detected-remote-generic-chip-code signal, the remote message data communicated from the remote unit.

Using the detected-remote-generic-chip-code signal and the base-generic-chip-code signal, the range means determines a range delay between the remote unit and the base station. The range means is embodied as a range delay device 530, which can compare the timing between the base-generic-chip-code signal from the generic-chip-code generator 501, with the detected remote-generic-chip-code signal from the generic-chip-code generator 521.

The present invention may include further the steps of spread-spectrum processing the base-message data; generating a base-generic-chip-code signal; combining the base-generic-chip-code signal with the spread-spectrum-processed-base-message data, thereby generating a base-CDMA signal; transmitting the base-CDMA signal from the base station to the remote unit; detecting the base-generic-chip-code signal embedded in the base-CDMA signal; recovering, using the detected-base-generic-chip-code signal, the base-message data; spread-spectrum processing remote-message data; generating, using the detected-generic-chip-code signal and the spread-spectrum-processed-remote data, a remote-CDMA signal; transmitting the remote-CDMA signal from the remote unit to the base station; detecting the remote-generic-chip-code signal embedded in the remote-CDMA signal; recovering, using the detected-remote-generic-chip-code signal, the remote-message data; and determining, using the detected-remote-generic-chip-code signal and the base-generic-chip-code signal, a range delay between the remote unit and the base station.

In use, the base station spread-spectrum processes the base-message data with a message-chip-code signal, and combines the spread-spectrum-processed-base-message data with a base-generic-chip-code signal. The combined signal is a base-CDMA signal which is transmitted over a communications channel to at least one remote unit.

The remote unit receives the base-CDMA signal, detects the base-generic-chip-code signal embedded in the base-CDMA signal, and uses the detected-base-generic-chip-code signal to recover the base-message data embedded in the base-CDMA signal.

The detected base-generic-chip-code signal is relayed as a remote-generic-chip-code signal, or is used to set the timing for a different remote-generic-chip-code signal, which is sent from the remote unit to the base station. The remote unit spread-spectrum processes the remote-message data with a remote-chip-code signal, and combines the spread-spectrum-processed-remote-message data with the remote-generic-chip-code signal as a remote-CDMA signal. The remote-CDMA is sent over the communications channel to the base station.

At the base station, the remote-generic-chip-code signal is detected from the remote-CDMA signal, and the detected remote-generic-chip-code signal is used to detect the remote-message data embedded in the remote-CDMA signal. Additionally, the detected remote-generic-chip-code signal is compared with the base-generic-chip-code signal in a range-delay circuit, to determine the range of the remote unit from the base station. Effectively, the range between the remote unit and the base station is a function of the timing between sending a sequence of the chip codeword which generated the base-generic-chip-code signal, and receiving the sequence generated by the chip codeword which generated the remote-generic-chip-code signal.

The concept of using a radio frequency (RF) signal to determine range is well known in the art. The RF signal is subject to a fixed rate of propagation, $3 \times 10^8$ meters/sec. The RF signal leaves a transmitter some time before it reaches a receiver. A particular sequence of the base-generic-chip-code signal and remote-generic-chip-code signal are used as a mark in time. The difference in time of the sequence of the base-generic-chip-code signal as seen at the receiver of the remote unit, from that present at the transmitter of the base station, is related directly to distance between the base station and remote unit. Similarly, the difference in time of the sequence of the remote-generic-chip-code signal as seen at the receiver of the base station form that present at the transmitter of the remote unit, is related directly to distance between the remote unit and base station.

The use of the base-generic-chip-code signal and the remote-generic-chip-code signal is a common type of echo range measurement method that is used in radar systems. Many radar systems simply employ a pulse of RF energy and then wait for a return of a portion of the energy due to the pulse being reflected from objects. The radar marks time from the instant of pulse transmission until its return. The time required for the pulse to return is a function of the two-way range to the object. The range is easily determined from the signal propagation speed.

The spread-spectrum signals of the present invention are subject to the same distance/time relationship. The spread-spectrum signal of the present invention has an advantage in that its phase is easily resolvable. The basic resolution of a sequence of a base-chip-code signal or a remote-chip-code signal is one code chip. Thus, the higher the chip rate, the better the measurement capability. Thus, at a chip rate of 10 Mchips/sec, a basic range resolution is $10^{-7}$ seconds, or 30 meters. Additional delays may be encountered in the circuitry of the remote unit. These delays can be compensated at the base station, when determining the distance between the base station and the remote unit.

Orthogonal Code Synchronization

The present invention may also be embodied as a system and method using orthogonal codes and knowledge of the distance to the mobile terminal to adjust and align the phase of the information channel to achieve orthogonality at the base station antenna.

The system for using orthogonal codes and knowledge of the distance to the mobile terminal to achieve orthogonality at the base station antenna comprises a plurality of mobile terminals and a base station. Each of the plurality of mobile terminals includes remote-spread-spectrum-processing means, remote-pilot means, combining means, remote-transmitting means, and code phase adjustment means.

The remote-spread-spectrum-processing means and the remote-pilot means are coupled to the combining means. The remote-transmitting means is coupled to the combining means.

The base station includes receiving means, first-base-pilot means, second-base-pilot means, first delay means, second delay means, correlator means, tracking means, range delay means, and base-transmitting means.

The remote-spread-spectrum-processing means processes remote-message data using a pseudo-noise code. The remote-pilot means generates a remote-pilot signal. The combining means combines the remote-pilot signal with the spread-spectrum-processed-remote-message data to generate a remote composite signal. The remote composite signal has the remote-pilot signal and at least one remote-user-information channel. The remote-transmitting means transmits the remote composite signal to the base station on a reverse channel of the duplex radio channel.

At the base station, the receiving means receives the remote composite signal. The first-base-pilot means generates a base pilot signal. The second-base-pilot means generates a base-pilot-reference-signal. The first delay means generates an on-time, an early, and a late version of the base-pilot-reference signal. The second delay means generates an information reference signal. The information reference signal is synchronized with the on-time version of the base-pilot-reference signal. Correlator means multiplies the remote composite signal with the on-time, the early, and the late versions of the base-pilot-reference signal to correlate out an on-time, an early, and a late version of the remote-pilot signal, respectively. Correlators means also multiplies the remote composite signal with the information reference signal to correlate out the remote-user-information channel.

Tracking means tracks the phase of the remote-pilot signal and, in response to a peak in the remote-pilot signal, outputs an acquisition signal. The acquisition signal signifies synchronization of the remote-pilot signal and the base-pilot-reference-signal.

In response to the acquisition signal, the range delay means calculates a phase difference between the base pilot signal and the base-pilot-reference-signal to determine the range between the mobile station and the base station. The base-transmitting means transmits the range from the base station to the mobile terminal over a forward channel of the duplex radio channel.

In response to the range information received from the base station, the code phase adjustment means at the mobile terminal adjusts the phase of the pseudo-noise code to determine the arrival time of the spread-spectrum-processed-remote-message data at the base station.

When adjusting the phase of the pseudo-noise code, the remote-spread-spectrum-processing means may adjust the pseudo-noise code in increments of a code chip. A base station processor compares signal strength levels of the spread-spectrum-processed-remote-message data as the mobile terminal adjusts the pseudo-noise code. In response to a code chip increment that maximizes performance, the base station calibrates a relationship between the remote-pilot signal and the spread-spectrum-processed-remote-message data with the code chip increment.

The spread spectrum CDMA cellular radio communications system may further comprise base-spreading means and base-combining means. The base-spreading means spread-spectrum processes base-message data. The base-spreading means may include means for processing base-message data for a particular mobile terminal with a selected chip code. The base-combining means combines the spread-spectrum-processed-base-message data and the base pilot signal as a composite base signal. The composite base signal includes a common-shared-spread-spectrum-pilot signal and at least one specific spread spectrum user information channel for each mobile terminal. The spreading code of each of the common-shared-spread-spectrum-pilot signal and the specific spread spectrum user information channel may contain an orthogonal code element. The remote-pilot signal may be slaved to the common-shared-spread-spectrum-pilot signal as a reference for phase and timing of the remote-pilot signal.

The remote-pilot signal and a spreading code of the remote-user-information channel of each mobile terminal may contain an orthogonal code element. Further, the remote-user-information channel may be synchronized to the remote-pilot signal.

The system may further comprise base station delay lock loop means for generating an error signal and for tracking the remote-pilot signal. The mobile terminal, responsive to receiving the error signal from the base station, adjusts an orthogonal pseudo-noise code phase to compensate for changes in range as the mobile terminal moves within the cell.

More specifically, the mobile terminal of the present invention comprises a remote user data source, a first orthogonal code set generator, a first noise-like code generator, a remote pilot data source, a signal combiner, a first modulo-two adder, a second modulo-two adder, a third modulo-two adder, a fourth modulo-two adder, a modulator, antenna means, a code phase adjuster, and a processor.

The first modulo-two adder is coupled to the remote user data source and to the first orthogonal code set generator. The second modulo-two adder is coupled to an output of the first modulo-two adder and to the first noise-like code generator. The third modulo-two adder is coupled to the first orthogonal code set generator and to the remote pilot data source. The fourth modulo-two adder is coupled to an output of the third modulo-two adder and to the first noise-like code generator. The signal combiner is coupled to the fourth modulo-two adder and to the second modulo-two adder. The modulator is coupled to the signal combiner. The code phase adjuster is coupled to the first orthogonal code set generator and to the first noise-like code generator. The processor is coupled to the code phase adjuster.

The remote user data source generates a user data signal. The first orthogonal code set generator generates a first orthogonal code and a first remote pilot code. The first modulo-two adder spread spectrum processes the user data signal with the first orthogonal code to generate a spread signal. The first noise-like code generator generates a first pseudo-noise code. The second modulo-two adder processes the spread signal with the first pseudo-noise code to generate a spread spectrum user data signal.

The remote pilot data source generates a pilot data signal. The pilot data signal may be comprised of all ones. Alternatively the remote pilot data source may generate a pilot data signal that is comprised of all zeros.

The third modulo-two adder spread spectrum processes the pilot data signal with the first remote pilot code to generate a spread pilot signal. The fourth modulo-two adder processes the spread pilot signal with the first pseudo-noise code to generate a remote spread spectrum pilot data signal.

The signal combiner combines the remote spread spectrum pilot data signal and the spread spectrum user data signal as a combined spread spectrum data signal. The modulator modulates the combined spread spectrum data signal onto a carrier as a combined spread spectrum modulated data signal. Antenna means transmit the combined spread spectrum modulated data signal on a reverse channel of a duplex radio channel. Antenna means also receives a composite spread-spectrum modulated carrier signal transmitted from the base station on a forward channel of the duplex radio channel. The composite spread-spectrum modulated carrier signal on the forward channel has a common-shared-spread-spectrum-pilot signal and a specific spread spectrum user information channel for the mobile terminal.

The code phase adjuster adjusts, responsive to an input from the processor and to the common-shared-spread-spectrum-pilot signal, a phase of the first orthogonal code to adjust the time of arrival of the spread spectrum user data signal at the base station. This phase adjustment adjusts the time of arrival to be orthogonal with other arriving spread specturm user data signals. The phase of the first remote pilot code is slaved to the common-shared-spread-spectrum-pilot signal to enable the base station to determine the range between the base station and the mobile terminal using round trip delay. The processor generates the processor input and stores the range between the base station and the mobile terminal.

The code phase adjuster may further adjust the phase of the first orthogonal code to have a same phase as the first pseudo-noise code. The length of the first pseudo-noise code is an integer multiple of a length of the first orthogonal code. The code phase adjuster may further shift, responsive to acquisition, a phase of the first remote pilot code to be synchronous with the spread spectrum user data signal.

The mobile terminal of the present invention may further comprise a power splitter, a second orthogonal code set generator, a second noise-like code generator, a mode control and acquisition device, a clock pulse generator, a fifth modulo-two adder, a sixth modulo-two adder, a first delay device, a second delay device, a first multiplier/correlator, a second multiplier/correlator, a third multiplier/correlator, a fourth multiplier/correlator, a delay lock loop, and a phase lock loop oscillator.

The mode control and acquisition device is coupled between the second orthogonal code set generator and the second noise-like code generator. The clock pulse generator is coupled to the mode control and acquisition device and to the first orthogonal code set generator and to the first noise-like code generator. The fifth modulo-two adder is coupled to the second orthogonal code set generator and to the second noise-like code generator. The sixth modulo-two adder is coupled to the second orthogonal code set generator and to the second noise-like code generator. The first delay device is coupled to the fifth modulo-two adder. The first, the second, and the third multiplier/correlators are each coupled to the power splitter and to the first delay device. The second delay device is coupled to the sixth modulo-two adder and to the processor. The fourth multiplier/correlator is coupled to the second delay device and to the power splitter. The delay lock loop is coupled to the second and third multiplier/correlators. The phase lock loop oscillator is coupled to the first multiplier/correlator.

The power splitter separates the composite spread-spectrum modulated carrier signal into a pilot channel and a data channel. The second orthogonal code set generator generates, responsive to a command from the base station, a plurality of locally generated pilot codes, any one of which, or any plurality of which, may be generated and/or used at any given time.

The second noise-like code generator generates a second pseudo-noise code. The mode control and acquisition device receives timing information from the base station and generates a clock for the second orthogonal code set generator and for the second noise-like code generator. The mode control and acquisition device also generates a synchronization signal. The clock pulse generator provides a synchronous clock signal. The clock pulse generator may have its own oscillator or may lock onto the clock from the mode control and acquisition device.

The fifth modulo-two adder combines a first locally generated pilot code and the second pseudo-noise code to form a first local spread-spectrum-pilot-reference signal. The sixth modulo-two adder combines a specified orthogonal code and the second pseudo-noise code to form a first local spread spectrum information reference signal. The first delay device delays, responsive to the processor, the first local spread-spectrum-pilot-reference signal to generate an on-time, an early, and a late version of the first local spread-spectrum-pilot-reference signal.

The first, the second, and the third multiplier/correlators multiply the composite-spread-spectrum-modulated-carrier signal with the on-time, the early, and the late versions of the first local spread-spectrum-pilot-reference signal to correlate out an on-time, an early, an a late version of the common-shared-spread-spectrum-pilot signal, respectively. The second delay device provides an information reference signal synchronized with the on-time version of the first local spread-spectrum-pilot-reference signal. The fourth multiplier/correlator multiplies the composite spread-spectrum modulated carrier signal with the first local spread spectrum information reference signal to correlate out the specific spread spectrum user information channel. The delay lock loop tracks the phase of the incoming common-shared-spread-spectrum-pilot signal and outputs, responsive to a correlation peak, a clock signal and an acquisition signal to the mode control and acquisition device. The phase lock loop oscillator centers on the correlation peak and provides a coherent carrier reference to a local data detector and to the delay lock loop.

Using the system just described, the base station can determine the range between the base station and the mobile terminal by measuring the code phase difference between the common-shared-spread-spectrum-pilot signal and the first remote pilot code. The common-shared-spread-spectrum-pilot signal may contain an orthogonal element. The first remote pilot code may also contain an orthogonal code element.

In the spread spectrum CDMA digital cellular radio system of the present invention, the system also includes a base station. The base station comprises a base user data source, a first orthogonal code set generator, a first noise-like code generator, a first modulo-two adder, a second modulo-two adder, a system data source, system data spreading means, a base pilot data source, pilot data spreading means, a signal combiner, a modulator, antenna means, pilot-reference-signal generating means, a clock pulse generator, range delay means, and a processor.

The first modulo-two adder is coupled to the base user data source and to the first orthogonal code set generator. The second modulo-two adder is coupled to an output of the first modulo-two adder and to the first noise-like code generator. The signal combiner is coupled to the pilot data signal spreading means, the system data spreading means, and the second modulo-two adder. The modulator is coupled to the signal combiner. The clock pulse generator is coupled to the first orthogonal code set generator and to the first noise-like code generator. Range delay means is coupled to an output of the pilot data spreading means and to an output of the pilot-reference-signal generating means.

The base user data source generates a base user data signal. The first orthogonal code set generator generates a first orthogonal code and a first base pilot code. The first modulo-two adder spread spectrum processes the base user data signal with the first orthogonal code to generate a spread signal. The first noise-like code generator generates a first pseudo-noise code. The second modulo-two adder processes the spread signal with the first pseudo-noise code to generate a spread spectrum user data signal. The system data source generates system data to be transmitted to the plurality of mobile terminals. The system data spreading means spread spectrum processes the system data. The base pilot data source generates a base pilot data signal. The pilot data signal spreading means spread spectrum processes the base pilot data signal with the first base pilot code as a common-shared-spread-spectrum-pilot signal.

The signal combiner combines the common-shared-spread-spectrum-pilot signal, the spread spectrum system data, and the spread spectrum user data signal as a combined spread spectrum data signal. The modulator modulates the combined spread spectrum data signal onto a carrier as a combined spread spectrum modulated data signal. Antenna means transmits the combined spread spectrum modulated data signal. Antenna means also receives a plurality of composite spread-spectrum modulated carrier signals transmitted from a plurality of mobile terminals, respectively. Each composite spread-spectrum modulated carrier signal has a received-remote-spread-spectrum-pilot signal and an information channel for each mobile terminal.

The pilot-reference-signal generating means generates a pilot-reference signal. The clock pulse generator maintains system-wide time. Range delay means calculates a phase difference between the pilot-reference signal and the common shared spread-spectrum pilot signal as a first value. The processor stores the first value and provides, using the first value, a processor output representing round trip delay to the mobile terminal.

The pilot data signal spreading means may comprise a third modulo-two adder and a fourth modulo-two adder. The third modulo-two adder is coupled to the first orthogonal code set generator and to the base pilot data source. The fourth modulo-two adder is coupled to an output of the third modulo-two adder and to the first noise-like code generator.

The third modulo-two adder spread spectrum processes the pilot data signal with the first base pilot code to generate a spread pilot signal. The fourth modulo-two adder processes the spread pilot signal with the first pseudo-noise code to generate a common-shared-spread-spectrum-pilot signal.

The system data spreading means may comprise a fifth modulo-two adder and a sixth modulo-two adder. The fifth modulo-two adder is coupled to the first orthogonal code set generator and to the system data source. The sixth modulo-two adder is coupled to an output of the fifth modulo-two adder and to the first noise-like code generator.

The first orthogonal code set generator generates a second orthogonal code. The fifth modulo-two adder spread spectrum processes the system data with the second orthogonal code to generate a spread-spectrum-data signal. The sixth modulo-two adder processes the spread-spectrum-data signal with the first pseudo-noise code to generate a spread-spectrum-system-data signal.

The base station may further comprise a power splitter, a second orthogonal code set generator, a second noise-like code generator, a mode control and acquisition device, a seventh modulo-two adder, an eighth modulo-two adder, a first delay device, a second delay device, a first multiplier/correlator, a second multiplier/correlator, a third multiplier/correlator, a fourth multiplier/correlator, a delay lock loop and a phase lock loop oscillator.

The mode control and acquisition device is coupled between the second orthogonal code set generator and the second noise-like code generator. The seventh modulo-two adder is coupled to the second orthogonal code set generator and to the second noise-like code generator. The eighth modulo-two adder is coupled to the second orthogonal code set generator and to the second noise-like code generator. The first delay device is coupled to the seventh modulo-two adder. The second delay device is coupled to the eighth modulo-two adder and to the processor. The first, the second, and third multiplier/correlators are each coupled to the power splitter and to the first delay device. The fourth multiplier/correlator is coupled to the second delay device and to the power splitter. The delay lock loop is coupled to the second and third multiplier/correlators. The phase lock loop oscillator is coupled to the first multiplier/correlator.

The power splitter separates the composite-spread-spectrum-modulated-carrier signal into a pilot channel and a data channel. The second orthogonal code set generator generates a third orthogonal code. The second noise-like code generator generates a second pseudo-noise code. The mode control and acquisition device provides clock and control signals.

The seventh modulo-two adder combines an assigned pilot orthogonal code and the second pseudo-noise code to form the first spread-spectrum-pilot-reference signal. The eighth modulo-two adder combines an assigned data orthogonal code and the second pseudo-noise code to form the first spread spectrum data reference signal.

The first delay device delays, responsive to the processor, the first spread-spectrum-pilot-reference signal to generate an on-time, an early, and a late version of the first spread-spectrum-pilot-reference signal. The first, the second, and the third multiplier/correlators multiply the composite-spread-spectrum-modulated-carrier signal with the on-time, the early, and the late versions of the first spread-spectrum-pilot-reference signal to correlate out an on-time, an early, and a late version of the received-remote-spread-spectrum-pilot signal, respectively.

The second delay device provides an information reference signal synchronized with the on-time version of the first spread-spectrum-pilot-reference signal. The fourth multiplier/correlator multiplies the composite spread-spectrum modulated carrier signal with the information reference signal to correlate out the information channel.

The delay lock loop tracks the phase of the received remote spread-spectrum pilot signal. In response to a correlation peak, the delay lock loop outputs a clock signal and an acquisition signal to the mode control and acquisition device. The phase lock loop oscillator provides a coherent carrier reference to a local data detector and to the delay lock loop.

Using the system just described, the base station can determine the range to each mobile terminal by measuring the code phase difference between the common-shared-spread-spectrum-pilot signal and the received-remote-spread-spectrum-pilot signal.

The mobile terminal may adjust, responsive to the round trip delay, a code phase of the information channel of each composite-spread-spectrum-modulated-carrier signal to coincide with a specific time mark as the composite-spread-spectrum-modulated-carrier signal arrives at the base station. The base station may set the specific time mark at an absolute time value to satisfy cell orthogonality criteria.

Figure 7A:
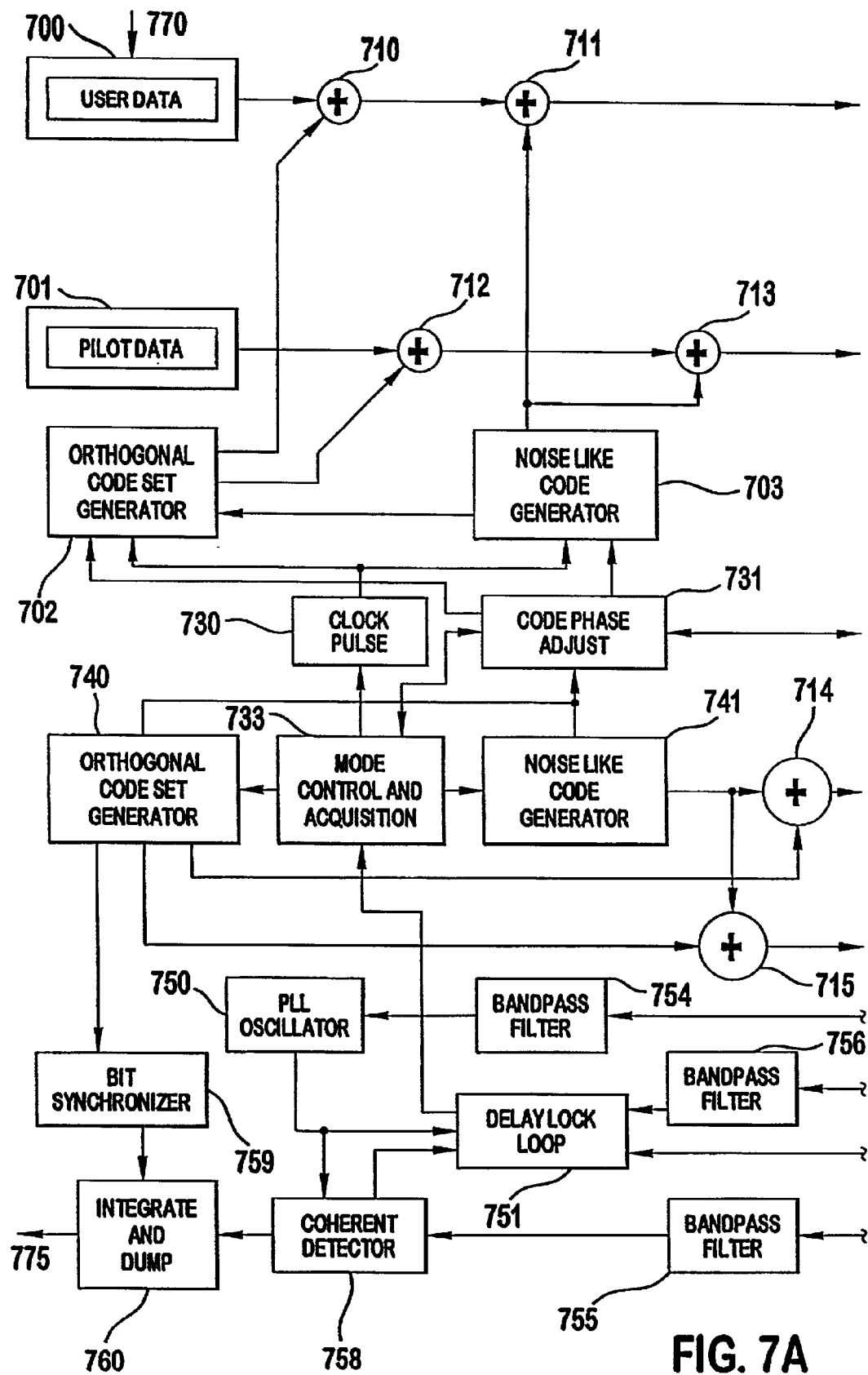
FIGS. 7a and 7b are block diagrams of a mobile terminal in accordance with the orthogonal code synchronization system and method of the present invention.
Figure 7B:
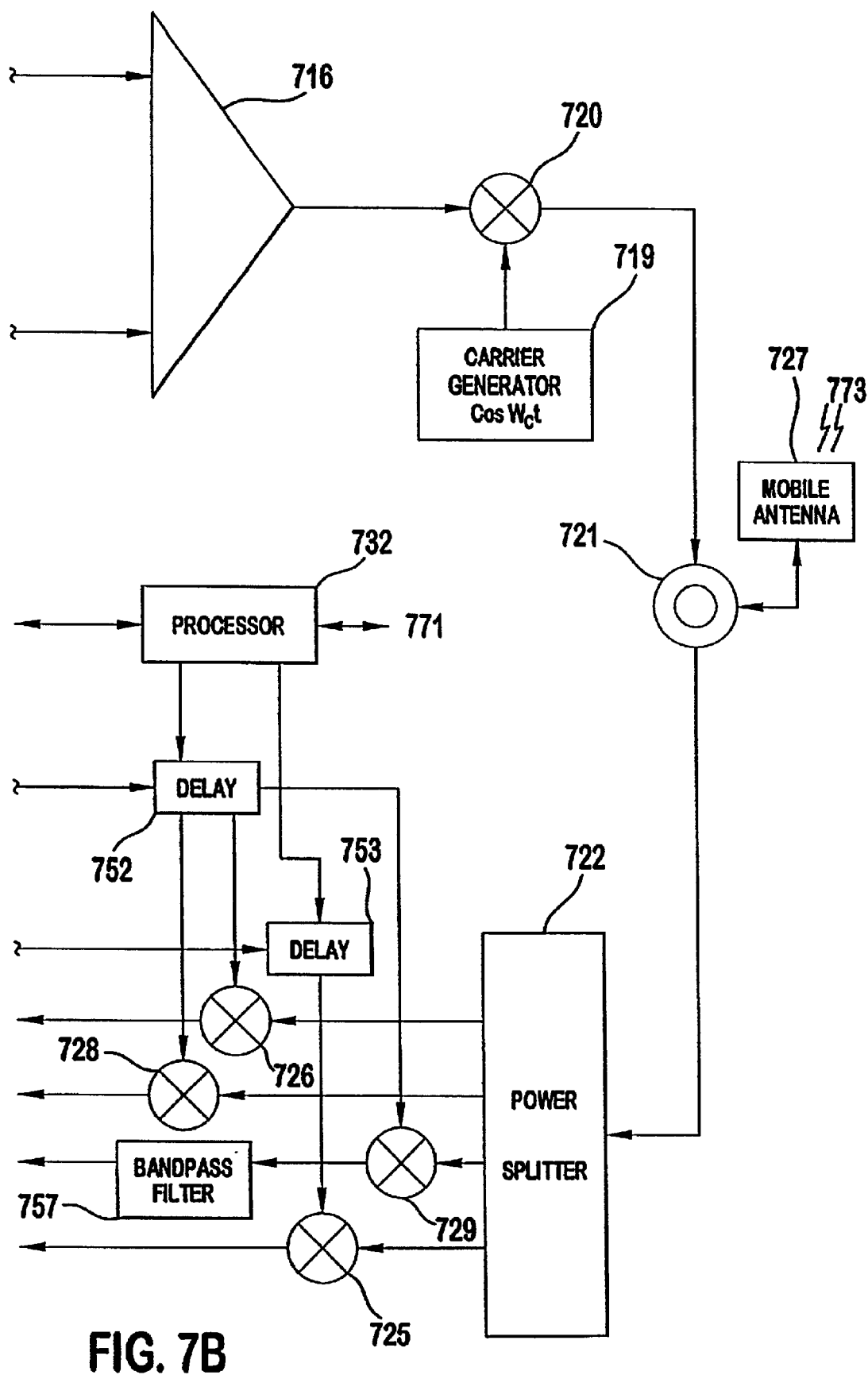

As illustratively shown in FIG. 7a and FIG. 7b, a mobile terminal of this invention may include a remote antenna 727, a remote terminal data source 700, a remote pilot data source 701, remote orthogonal code set generators 702, 740, noise-like code generators 703, 741, six modulo-two adders 710–715, a combiner 716, a radio frequency modulator/translator 720, a clock pulse generator 730, a processor 732, a code phase adjuster 731, a mode control and acquisition device 733, four bandpass filters 754, 755, 756, 757, a bit synchronizer 759, a coherent detector 758, an integrate and dump circuit 760, a delay lock loop 751, two delay elements 752, 753, four multiplier correlators 725, 726, 728, 729, a phase lock loop oscillator 750, a power splitter 722, a diplexer 721, and a carrier generator 719. FIG. 7 also shows processor input/output 771, user data input 770, and radio frequency input/output 773.

The remote terminal data source 700 of FIG. 7 is the information presented to the mobile terminal by the remote user. This information can be voice, data, fax or any other form of information that the user desires to send over his mobile terminal to another user, machine or system. The processor 732 also generates messages for use by the radio system or other distant user, and provides these messages to the remote user data source through the user data input 770 where the messages are multiplexed with the user data. The remote user data source presents the multiplexed user data signal to the modulo-two-adder 710 where an assigned orthogonal code, operating at a much higher bit rate than the user data, is superimposed on the user data signal. The orthogonal code spreads the user data signal so that several similar signals may occupy the same spectrum and be recovered at the base station. The spread signal is superimposed by an additional PN code by the modulo-two-adder 711 to make the resulting spread spectrum signal more like random noise. The PN code is generated by the noise-like code generator 703. The spread spectrum user data signal is combined with the spread spectrum pilot data signal in the combiner 716. The combined spread spectrum data signal is modulated on the carrier frequency, $w_c$, by the radio frequency modulator/translator 720. The spread spectrum modulated data signal is routed to the remote antenna 727 through the diplexer 721, which allows the remote antenna 727 to be used for both transmitting and receiving. The remote antenna 727 transmits the composite-spread-spectrum-modulated-carrier signal over the air to the base station antenna means where it is received. Many other implementations are possible and would be obvious to one skilled in the art. For instance, the orthogonal code and the noise-like code could be combined before they are added to the data. The modulation could be done at baseband by using quadrature carrier components and combining the components at radio frequencies. Different PN codes could be used on the different quadrature components to add to the randomness of the composite signal. These are well known techniques to those schooled in the technology.

The orthogonal code set generator 702 can generate any code that belongs to the predetermined set of codes and is directed to generate a specific code by the processor 732. The processor 732 in turn receives its direction through input/output 771 from the base station control means over the control channel. The orthogonal code set generator 702 sets up and generates the assigned code, as described above, and said orthogonal code is used to spread the user data signal in modulo-two-adder 710. The orthogonal code set generator 702 also generates a second assigned orthogonal code that is used to spread the pilot data signal in modulo-two-adder 712. The phases of these codes are adjusted independently, but the clock rate is the same for both codes. After acquisition, for all modes of operation, the clock pulse generator 730 is slaved to the incoming, or base station, timing and clock received from the mode control and acquisition device 733. During acquisition mode, the clock pulse generator 730 uses an internal oscillator that operates at approximately the expected rate that will be received from the base station. This internal oscillator can be set to be slightly higher or lower in clock rate to allow the scanning of the incoming composite spread signal. Upon acquisition, the mode control and acquisition device 733 provides a clock synchronization signal to the clock pulse generator 730.

The phase of the orthogonal code can be adjusted to the same phase as the incoming pilot code from the base station. This makes the transmitted user pilot signal look like a reflection from the mobile terminal and the base station can measure the round trip delay to each specific mobile terminal. This round trip delay, measured in code chips, is sent to the mobile terminal and stored in the processor 732. One-half of the round trip delay is the distance between the mobile terminal and the base station measured in code chips. The accuracy of the distance can be improved by using increments of one-eighth or one tenth of the chip times and determining the peak output power from the correlator at the base station and then sending the delay time to the mobile terminal with a fraction of a chip accuracy.

The mobile terminal has the ability to adjust the phase of the orthogonal code in fractions of a chip, for instance one-eighth, one-tenth or one-sixteenth, as directed by the code phase adjuster 731 which, with the assistance of the processor 732, determines the phase of the received pilot signal and translates that into the proper initial states for the remote pilot spreading code.

To cause the transmitted, reverse link, spread spectrum user data signal to be orthogonal with the other transmitted spread spectrum user data signals, as the signals arrive at the base station, the phase of the code transmitted by each user must be adjusted to compensate for the different path lengths, or distances, to each of the individual users. Each of the mobile terminals has stored in its memory the distance to the base station. With this information the processor 732 determines the phase adjustment required to have the spread spectrum user data signal arrive at the base station at the specified time. The code phase adjuster 731 then provides the initial code settings for the orthogonal code set generator 702 and starts the generator at the proper time. The base station user data channel calibration detector detects the error voltage to maximize the correlation output power, in fractions of a chip, and sends a correction signal to the mobile terminal to provide incremental adjustments to the user data orthogonal code phase to fine tune the relative position of the transmitted signals. These incremental adjustments, with the pilot tracking error signal, compensate for normal movement of the mobile terminal and track the mobile terminal as it moves in the region.

Very rapid changes in code phases will require the reacquisition of the data signal by repeating the range measurement technique, using the pilots as described above. The noise-like code generator 703 is phase adjusted by the code phase adjuster 731 to have the same phase as the orthogonal code set generator 702. Since the noise-like PN code is much longer than the orthogonal code, the orthogonal code and the noise-like PN code are adjusted to appear to start at the same time and the orthogonal code will repeat many times during one cycle of the noise-like PN code and they will end at the same time. Therefore, they both start at the beginning of an epoch, where the epoch is the length of the noise-like PN code. The length of the orthogonal code is an even integer of the longer noise-like PN code. The same noise-like PN code is used for all users and becomes a digital carrier for all the user data signals. When the noise-like PN code is synchronously detected, it has no impact on the discrimination between the different orthogonal codes.

The process described above results in the transmitted user data signal and the transmitted pilot having different absolute phases with respect to the system time reference. Therefore, the pilot spread spectrum signals cannot be orthogonal to the user data signals. This means, assuming every user terminal also has a pilot signal, if half of the signals appear as random noise and the other half do not contribute interference, the interference has been reduced by 3 db. The pilot data from the remote pilot data source 701 can be all zeros, all ones or actually have a low data rate information signal input on the pilot channel. Assuming an "all ones" input for the remote pilot data source 701, the pilot channel only transmits the addition of the orthogonal code selected for the pilot and the noise-like PN code.

As stated previously, the phase and timing of the remote pilot are slaved to the incoming pilot from the base station. The pilot is slaved to appear to have no delay as it passes through the mobile terminal. This is a key feature of this invention and allows the base station to accurately measure the round trip delay. The base station provides this round trip delay information to the mobile terminal which uses it during acquisition to adjust the phase of the transmitted user data signal so that the base station can quickly acquire the user data signal in the orthogonal mode of operation. Since the mobile terminal uses the same carrier for both the pilot and user data signals, the pilot carrier phase is used to coherently detect the user data. As stated above, after acquisition the distance information from the pilots is not necessary during the normal transfer of data mode. Therefore, the mobile terminal includes a mode, used after acquisition has occurred, where the pilot code phase is shifted to have the same phase as the user data channel. In this mode the pilots are also orthogonal if the assigned pilot codes are members of the orthogonal code set. This feature of the present invention nearly doubles the system capacity again. This also means the pilot can be transmitted at relatively high power levels since the pilot does not contribute interference to the other signals. It does mean, though, that the number of users has been reduced if the limitation on capacity is caused by a limited number of orthogonal codes and not processing gain. Since this feature is controlled from the base station, the base station can make the assessment as to which mode will give the best performance with the largest capacity and act accordingly.

The pilot data is modulo-two added to the code assigned to the pilot in the adder 712, which results in a spread spectrum reverse link pilot signal. This signal also has a noise-like PN signal added to it in the adder 713, where the pilot signal is made to appear more like a random noise spread spectrum signal. This noise-like spread spectrum pilot signal is combined with the spread spectrum user data signal in the combiner 716 to form the composite spread spectrum signal that is then modulated onto the carrier in the modulator/translator 720. This modulated composite spread spectrum signal passes through the diplexer 721 and on to the antenna 727.

The antenna 727 also receives the composite spread spectrum signal transmitted from the base station. This signal is passed through the diplexer 721 where it is isolated from the transmitted signal, and is divided in the power splitter 722 into a pilot channel and a data channel. The pilot channel may use three different correlators to track the carrier and spreading code; these three correlators are composed of multiplier/correlators 726, 728, 729 plus integrator/bandpass filters 754, 756, 757. The delay lock loop 751 tracks the phase of the incoming code and keeps the local pilot code, generated by modulo-two adding the locally generated orthogonal and noise-like codes, in synchronization with the composite spread spectrum signal transmitted by the base station. The local pilot code is multiplied with the incoming composite spread signal in the multiplier/correlators 726, 728, 729. The delay element 752 delays the reference pilot inputs to the multiplier/correlators 726, 728, 729 in such a way as to yield an on-time, an early, and a late version of the reference pilot, respectively. The early and late signals, multiplied by multiplier/correlators 728, 729, respectively, are used by the delay lock loop 751 to track the incoming signal. When the codes are phase aligned with the inputs to the three multiplier/correlators 726, 728, 729 coming from the power splitter, a maximum signal appears at the output of each multiplier/correlator 726, 728, 729. When the incoming signal is thus on track, the delay lock loop 751 passes a clock signal and an acquisition signal to the mode control and acquisition device 733. Any equivalent error generating device may be used to perform the function of the delay lock loop as would be known to persons of skill in the art.

The delay element 752 also provides an on-time path that is used by the phase lock loop oscillator 750. The phase lock loop oscillator 750 is centered on the correlation peak and provides the maximum carrier signal strength. The data channel delay element 753 also places the data channel to have the same alignment, on-time and maximum carrier strength, as the phase lock loop path. The phase lock loop oscillator 750 provides a coherent carrier reference to the coherent detector 758 and to the delay lock loop 751. The orthogonal code set generator 740 provides an orthogonal code, as assigned by the base station through the processor 732, to modulo-two adder 715, where the orthogonal code is combined with the output of the noise-like code generator 741 to form the local data spread spectrum reference signal. Since the base station pilot code and the user data code channels are synchronized and transmitted on the same RF carrier, the phase of the local code and the carrier phase of the pilot channel, after acquisition, can be used to demodulate the user data channel. The reference signal coming from the adder 715 is delayed by delay element 753 and multiplied with the incoming received combined spread spectrum signal in the multiplier/correlator 725 to correlate out the user data channel. The output of multiplier/correlator 725 is integrated in the bandpass filter 755 to make the information channel arrive at the correlation peak for detection by the coherent detector 758. The output of the coherent detector 758 is integrated over the information bit period by the integrate and dump circuit 760. The integrate and dump circuit 760 samples the output at the time determined by the bit synchronizer 759. The bit synchronizer 759 is synchronized with the orthogonal code set generator 740 so that when the codes are synchronized the data bits are also automatically synchronized. This occurs because the data in the base station transmitter is also synchronized to the base station orthogonal code generator. The output signal 775 is the user data multiplexed with specific channel overhead data that is stripped out of the data signal by a demux, not shown, and sent to the processor 732. This overhead data includes power control messages, code phase alignment messages, mode change messages etc. These messages come into the processor over the processor input/output 771.

Orthogonal code set generator 740 is identical to orthogonal code set generator 702, and noise-like code generator 741 is identical to noise-like code generator 703. Orthogonal code set generator 740 and noise-like code generator 741 are clocked by mode control and acquisition device 733. Before acquisition, mode control and acquisition device 733 uses a stable internal clock to provide timing to the code generators; after acquisition, the PLL oscillator 750 is slaved to the clock derived from the delay lock loop 751. The clock pulse generator 730 is also slaved to the output of the mode control and acquisition device 733.

Figure 8:
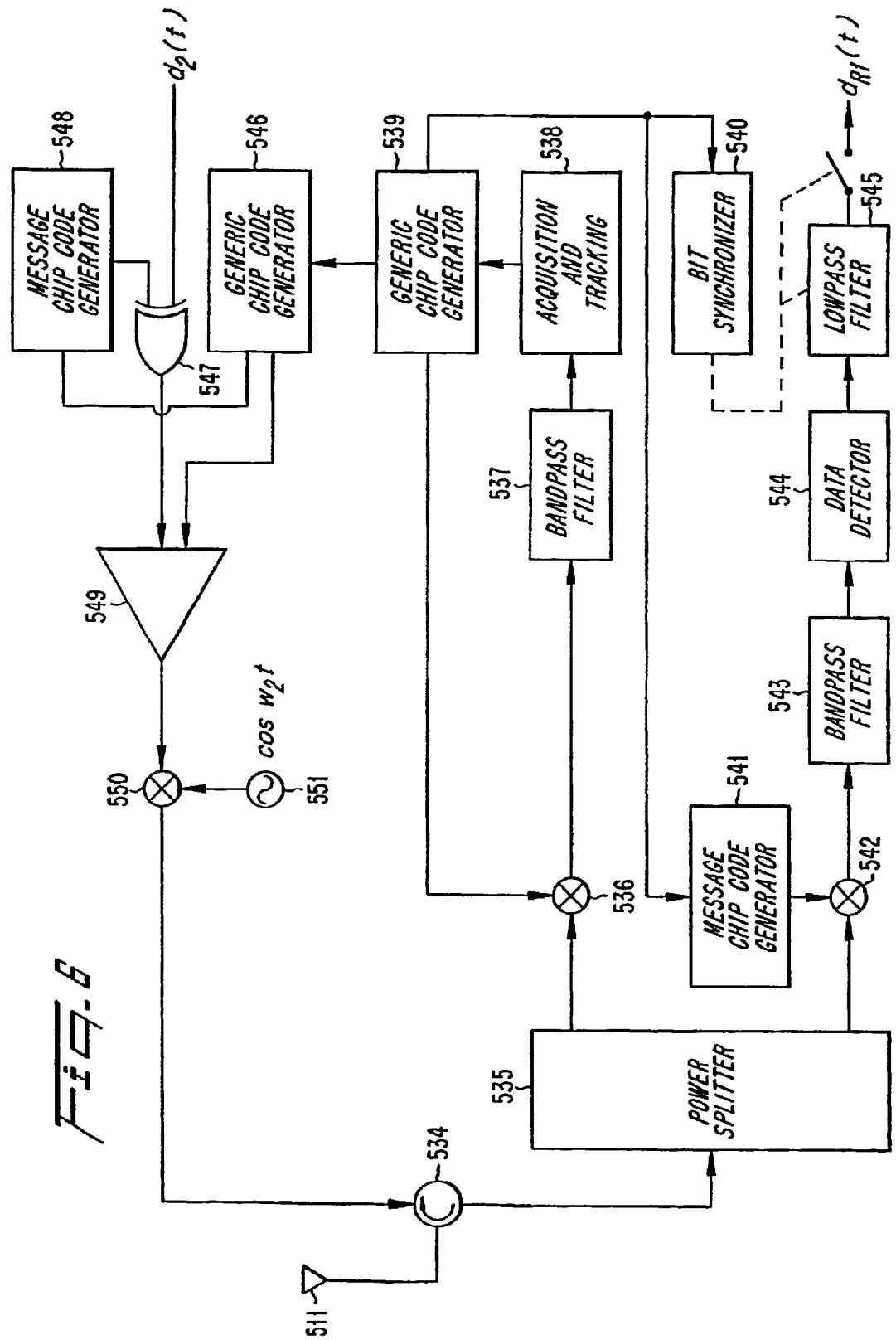
FIGS. 8a and 8b are block diagrams of a base station of the orthogonal code synchronization system and method.
Figure 8A:
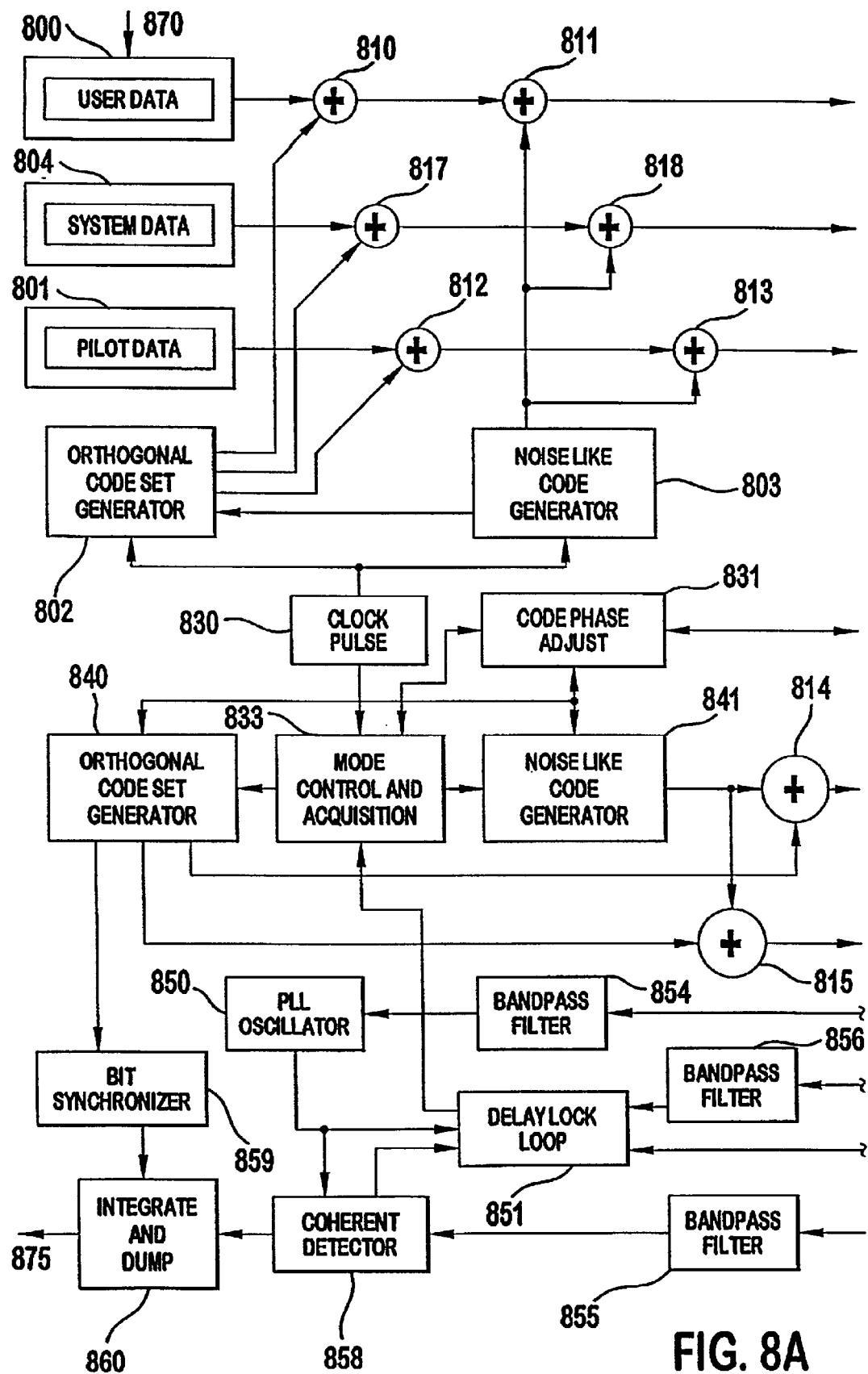
Figure 8B:
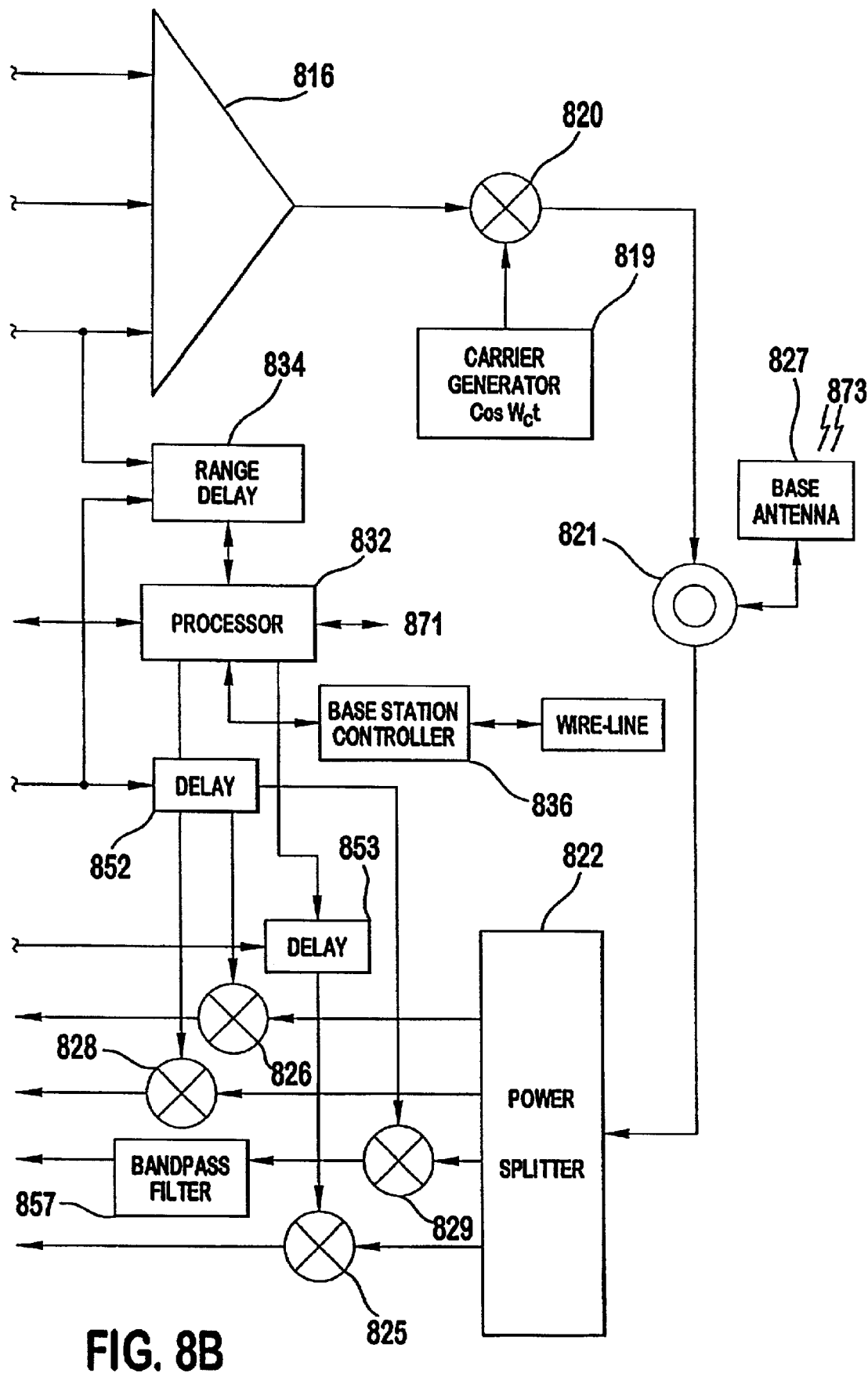

As illustratively shown in FIG. 8a and FIG. 8b, a base station according to the present invention includes a base station antenna 827, user data sources 800, pilot data source 801, orthogonal code set generators 802, 840, noise-like code generators 803, 841, eight modulo-two adders, 810–815 and 817–818, a signal combiner 816, radio frequency translator/modulator 820, a clock pulse generator 830, range delay device 834, processor 832, controller 836, code phase adjuster 831, mode control and acquisition device 833, four bandpass filters 854, 855, 856, 857, bit synchronizer 859, coherent detector 858, integrate and dump circuit 860, delay lock loop 851, delay elements 852, 853, four multiplier correlators 825, 826, 828, 829, phase lock loop oscillator 850, power splitter 822, multicoupler 821, and carrier generator 819. FIG. 8a and FIG, 8b also shows processor input/output 871, user data input 870, user data output 875, and radio frequency input/output 873.

FIG. 8a and FIG. 8b is illustrative of a base station that exhibits the features of this invention. There are many similarities between the base station of FIG. 8a and FIG. 8b and the mobile terminal of FIG. 7a and FIG. 7b. In the following discussion, the differences between the base station and the mobile terminal are emphasized.

In FIG. 8a and FIG. 8b there are three data sources. In addition to the user data and the pilot data as shown in FIG. 7a and FIG. 7b, there is a need for system data that is transmitted to all the users that are connected to the base station. This type of data includes general system parameters, paging information, system synchronization marks, control information and channel assignments. Much of this system information originates at the network central controller and is sent to the base controller 836, over land lines, where it is adapted to the individual cell. The processor 832 works in conjunction with the controller 836 to interface these messages into the base station. This is information that is generally broadcast so that all users can receive it before they are assigned to a specific channel.

The system information that is transmitted to a specific user while the mobile terminal is operating on an assigned channel is input to the user data means at input 870 and is multiplexed with the user data. The system data is also spread with a unique orthogonal code, generated by the orthogonal code set generator 802, in adder 817 and is further randomized by adding an additional noise-like PN code in adder 818. The noise-like PN code is generated by noise-like code generator 803. There can be several system data channels; each one spread with a unique orthogonal code, but all using the same noise-like PN code. The same noise-like PN code is added to all the channels including all data channels, all system channels and the pilot channel. There is only one pilot channel and it uses one of the unique orthogonal codes, usually the code that is all zeros. This means the noise-like PN code is essentially the pilot code, but it is also a component of all the other codes. The concept of a pilot on the forward link is commonly accepted and well documented in the prior art; see U.S. Pat. No. 5,228,056, U.S. Pat. No. 5,420,896, U.S. Pat. No. 5,103,459 and U.S. Pat. No. 5,416,797. There are also several means for generating different pilots for different base stations, including deliberately introducing a fixed code phase shift; see U.S. Pat. No. 5,103,459 and U.S. Pat. No. 5,416,797.

FIG. 8 only shows one user data source 800, for illustrative purposes, but there will normally be many user data sources or channels, one for each active user. Each active user will be assigned a unique orthogonal code and will use the same noise-like PN code. Therefore, the input to combiner 816 will normally include many user data channels, several system channels and a pilot channel. The output of combiner 816 is a composite spread spectrum signal that is modulated on the carrier, $w_c$, in translator/modulator 820. The modulated composite spread spectrum signal is sent to the base antenna 827 through multi-coupler 821. The multicoupler 821 not only provides isolation between the transmit and receive signals, as is done in the mobile terminal, but has to also isolate multiple transmit signals from each other. An alternate approach would be to combine the signals at a low power level and use linear amplifiers for the final stages.

The clock pulse generator 830 is derived from a stable oscillator and is the basic clock for the entire cell. Absolute time is maintained throughout the system. This same absolute time at all base stations allows the mobile terminal to determine absolute time delay to several base stations, resulting in accurate geographical position determination. The clock pulse generator 830 provides the clock for both the orthogonal code generator 802 and the noise-like code generator 803. It also provides the clock for the orthogonal code generator 840 and the noise-like code generator 841 when the reverse link is operating in the orthogonal code mode. When the receiver is not operating in the orthogonal code mode, and it has acquired an assigned user signal, the orthogonal code generator 840 and the noise-like code generator 841 use the clock generated by the delay lock loop 851 as their clock source.

When the pilot receive channel has acquired the user pilot signal, on the reverse channel, and the delay lock loop 851 is tracking the incoming pilot signal, the reference pilot code, produced by adding the outputs of orthogonal code set generator 840 and the noise-like code generator 841 in adder 814, is in complete synchronization with the pilot signal from the user. When this state occurs, an output of adder 814 is accepted by the range delay device 834 and the phase of this pilot code is compared to the phase of the base station pilot code, taken from the output of adder 813. With the assistance of the processor 832, the range delay device 834 calculates the phase difference between the two signals and places this value in memory in the processor 832. The value of the round trip delay is also sent to the mobile terminal that is transmitting the user pilot signal, through input port 870 on user data source 800, or as part of the set-up command on the assignment channel.

When the mobile terminal is in the pilot ranging orthogonal mode of operation, the base station is sending the user terminal ranging information and the user terminal is sending back user data on the return link in the orthogonal mode. There may be a small fixed offset between the pilot channel range measurement and the correct phase to achieve maximum noise reduction on the orthogonal channel. To remove this offset, the processor 832 sends commands to the mobile terminal to move the phase relationship between the user pilot and user data channel in fractions of a chip, one-eighth, one-tenth or one-sixteenth, while the processor 832 observes the output level of the integrate and dump circuit 860. When the peak output signal level is observed, that offset is locked and maintained. This process calibrates the relationship between the user pilot and user data channels. Once optimized, this relationship should not change significantly during the course of a normal transmission. It can always be re-instituted after a fixed interval.

When the mobile terminal is in the mode of also transmitting an orthogonal pilot that is synchronized with the user data channel, the delay lock loop 851 error voltage is sent to the processor 832, analyzed and supplemented with a predictive component, and transmitted to the mobile terminal for use in correcting the phase of the composite signal transmitted back by the mobile terminal. Since the error is detected in the base station and the correction is made in the mobile station, there is an inherent delay in the loop. This delay is small, however, in comparison to the normal movement of the user and, since the movement of the user will not normally change direction rapidly, a prediction can be made based on the last measurements. If the path length has a sudden jump of several chips, then the mobile terminal is commanded to return to the previous mode using the ranging information to reacquire. This would only happen if a strong primary multipath was faded rapidly and there was no existing secondary ray, but a new secondary ray appeared soon after the loss of the first.

Therefore, according to this invention, the base station receiver can receive data from the mobile terminal in one of four modes. The first mode allows the mobile terminal to send an independent user pilot, not synchronized with the base station, on the reverse link and the user data channel is synchronized to this independent user pilot. The second mode requires the user terminal to slave its user pilot to the pilot it receives from the base station and the user data channel is synchronized with this slaved user pilot. This second mode allows the user terminal to receive round trip delay information for purpose of geolocation and rapid reacquisition. The third mode requires the user terminal to slave its user pilot to the incoming base station pilot, as in the case of mode two, but the user data channel operates in the orthogonal mode using the ranging information received from the base station. The phase relationship between the user pilot channel and the user data channel is calibrated; one technique is described above, but there are many other techniques that should be obvious to one skilled in the art. The user pilot carrier is also the carrier for the user data channel and can be used as the carrier reference for detecting the user data channel. The fourth mode employs the slaved pilot implementation of mode three for acquisition but, after acquisition, phase shifts the user pilot code to be synchronous with the user data channel, thus also making the pilot an orthogonal channel. This means the pilot no longer contributes interference to the user data channels, within the cell, and can be transmitted at higher power levels.

The present invention may further comprise a spread-spectrum CDMA cellular radio communications method for communicating remote-message data from a mobile terminal to a base station over a duplex radio channel. The method includes using a pilot on the return link to achieve orthogonality at the base station antenna.

The method comprises the steps of spread spectrum processing remote message data using a pseudo-noise code, generating a remote-pilot signal, and combining the remote-pilot signal with the spread-spectrum-processed-remote-message data to generate a remote-CDMA signal. The remote CDMA signal contains the remote-pilot signal and a data signal.

The method then comprises the steps of transmitting the remote-CDMA signal from the mobile terminal to the base station on a reverse channel of the duplex radio channel. The base station receives the remote-CDMA signal and splits the remote-CDMA signal into a pilot channel and a data channel. The method then comprises the steps of generating a base-pilot signal and generating a base-pilot-reference signal. The base-pilot-reference signal is split and delayed to generate an on-time version of the base-pilot-reference signal, an early version of the base-pilot-reference signal, and a late version of the base-pilot-reference signal. The on-time, the early and the late versions of the base-pilot-reference signal are used to correlate out an on-time, an early, and a late version, respectively, of the remote-pilot signal.

The method then comprises the steps of generating a base-data-reference signal and correlating out the data signal using the base-data reference signal. The phase of the remote-pilot signal is tracked and, responsive to a peak in the remote-pilot signal, an acquisition signal is output signifying synchronization of the remote-pilot signal and the base-pilot-reference signal. In response to the acquisition signal, the phase of the remote-pilot signal may be shifted to be synchronous with the data signal. The remote-pilot signal may also be slaved to the base-pilot signal.

The method then comprises the steps of measuring, in response to the acquisition signal, a code phase difference between the base-pilot signal and the base-pilot-reference signal to determine the range between the mobile terminal and the base station. The range is transmitted to the mobile terminal and, in response to the range, the mobile terminal adjusts the phase of the pseudo-noise code to adjust an arrival time of the data signal at the base station and to achieve orthogonality at the base station.

It will be apparent to those skilled in the art that various modifications can be made to the spread-spectrum communications system and method of the instant invention without departing from the scope or spirit of the invention, and it is intended that the present invention cover modifications and variations of the spread-spectrum communications system and method described herein provided they come within the scope of the appended claims and their equivalents.

I claim:

1. A method for geographically locating a mobile terminal within a wireless CDMA communication system having base stations with fixed locations, the method comprising:

transmitting from a plurality of base stations a first spread spectrum signal having an associated code;

receiving of the first spread spectrum signals transmitted by said plurality of base stations at the mobile terminal;

for each received first spread spectrum signal, transmitting a second spread spectrum signal having an associated code time synchronized with that received first spread spectrum signal from the mobile terminal to said plurality of base stations, wherein the synchronizing of the associated code of the second spread spectrum signal with that received first spread spectrum signal is by despreading that received first spread spectrum signal using the associated code of the first spread spectrum signal, processing that despread received first spread spectrum signal by a delay lock loop, and adjusting a timing of the associated code of the first spread spectrum signal used for despreading and a clock pulse in response to the delay lock loop, and adjusting a timing of the associated code of the second spread spectrum signal in response to the adjusted timing of the clock pulse and the associated code of the first spread spectrum signal;

receiving the second spread spectrum signals at the plurality of base stations;

determining a delay between each base station and the mobile terminal based on in part a received timing of the second signals, wherein the determining a delay between each base station and the mobile terminal is by despreading that received second spread spectrum signal using the associated code of the second spread spectrum signal, processing that despread received second spread spectrum signal by a delay lock loop, and adjusting a timing of the associated code of the second spread spectrum signal used for despreading in response to the delay lock loop, and comparing a timing of the time adjusted associated code of the second spread spectrum signal and the associated code of the first spread spectrum signal; and determining the mobile terminal's geographic location based on in part round trip delay information between the mobile terminal and each base station of signals transmitted between the mobile terminal and the respective base stations.

2. The method of claim 1 wherein the determining of the mobile terminal's geographic location is performed at the mobile terminal.

3. The method of claim 1 wherein the base stations are time synchronized with each other.

4. The method of claim 2 further comprising each base station transmits the determined delay between the mobile terminal and that base station.

5. The method of claim 4 further comprising the mobile terminal receiving the transmitted determined delays.

6. A mobile terminal for use in a wireless CDMA communication system having a plurality of base stations, each base station transmitting a first spread spectrum signal having an associated code, the mobile terminal comprising:

means for receiving the first spread spectrum signals transmitted by said plurality of base stations at the mobile terminal; means for each received first spread spectrum signal, transmitting a second spread spectrum signal to said plurality of base stations having an associated code time synchronized with that received first spread spectrum signal, whereby enabling each base station to make a delay determination, wherein the synchronizing of the associated code of the second spread spectrum signal with that received first spread spectrum signal is by despreading that received first spread spectrum signal using the associated code of the first spread spectrum signal, processing that despread received first spread spectrum signal by a delay lock loop, and adjusting a timing of the associated code of the first spread spectrum signal used for despreading and a clock pulse in response to the delay lock loop, and adjusting a timing of the associated code of the second spread spectrum signal in response to the adjusted timing of the clock pulse and the associated code of the first spread spectrum signal;

means for receiving the delay determination from each base station; and means for determining the mobile terminal's geographic location based on in part round trip delay information between the mobile terminal and each base station of signals transmitted between the mobile terminal and the respective base stations.

7. The mobile terminal of claim 6 wherein the first and second spread spectrum signals are pilot signals.

8. A wireless CDMA system for geographically locating a mobile terminal, the system comprising:

a plurality of base stations with fixed locations, each base station comprising:
   means for transmitting a first spread spectrum signal having an associated code;
   means for receiving a second spread spectrum signal having an associated code transmitted by said plurality of base stations;
   means for determining a delay between the mobile terminal and that base station based on in part a received timing of the received second signal from the mobile terminal to said plurality of base stations; and
   means for transmitting the delay determination to the mobile terminal; and the mobile terminal comprising:
   means for receiving the first spread spectrum signals at the mobile terminal;
   means for each received first spread spectrum signal, transmitting the second spread spectrum signal having its associated code time synchronized with that received first spread spectrum signal, wherein the synchronizing of the associated code of the second spread spectrum signal with that received first spread spectrum signal is by despreading that received first spread spectrum signal using the associated code of the first spread spectrum signal, processing that despread received first spread spectrum signal by a delay lock loop, and adjusting a timing of the associated code of the first spread spectrum signal used for despreading and a clock pulse in response to the delay lock loop, and adjusting a timing of the associated code of the second spread spectrum signal in response to the adjusted timing of the clock pulse and the associated code of the first spread spectrum signal;
   means for receiving the delay determination from each base station; and
   means for determining the mobile terminal's geographic location based on in part round trip delay information of signals transmitted between the mobile terminal and the respective base stations.

9. The system of claim 8 wherein the base stations are time synchronized with each other.

* * * * *

UNITED STATES PATENT AND TRADEMARK OFFICE
CERTIFICATE OF CORRECTION

PATENT NO. : 6,898,197 B1
DATED : May 24, 2005
INVENTOR(S) : Gil Lavean

It is certified that error appears in the above-identified patent and that said Letters Patent is hereby corrected as shown below:

Column 2,
Line 45, after "on a", delete "bit-by-by" and insert -- bit-by-bit --.

Column 8,
Line 51, after "a", delete "is".

Column 16,
Line 3, after "generator", delete "501" and insert -- 502 --.
Line 4, after "generator", delete "502" and insert -- 501 --.

Column 32,
Line 52, after "for", insert -- the --.

Column 34,
Line 54, after "terminal;", insert a paragraph break.

Signed and Sealed this

Twenty-fifth Day of April, 2006

JON W. DUDAS
*Director of the United States Patent and Trademark Office*